(12) United States Patent
Luo et al.

(10) Patent No.: US 11,937,298 B2
(45) Date of Patent: Mar. 19, 2024

(54) COORDINATED CLEAR CHANNEL ASSESSMENT (CCA) FOR WIRELESS REPEATERS

(71) Applicant: QUALCOMM INCORPORATED, San Diego, CA (US)

(72) Inventors: Jianghong Luo, Skillman, NJ (US); Jing Sun, San Diego, CA (US); Xiaoxia Zhang, San Diego, CA (US); Navid Abedini, Basking Ridge, NJ (US); Junyi Li, Fairless Hills, PA (US); Tao Luo, San Diego, CA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/447,787

(22) Filed: Sep. 15, 2021

(65) Prior Publication Data
US 2023/0084692 A1 Mar. 16, 2023

(51) Int. Cl.
H04W 74/08 (2009.01)
H04B 7/26 (2006.01)
H04L 12/413 (2006.01)

(52) U.S. Cl.
CPC ...... *H04W 74/0808* (2013.01); *H04B 7/2612* (2013.01); *H04L 12/413* (2013.01)

(58) Field of Classification Search
CPC .... H04B 7/2612; H04L 12/413; H04W 74/08; H04W 74/0808
See application file for complete search history.

(56) References Cited

U.S. PATENT DOCUMENTS

| 10,187,187 B2 * | 1/2019 | Dinan | H04L 5/001 |
| 10,278,208 B2 * | 4/2019 | Choi | H04W 84/12 |
| 10,433,337 B2 * | 10/2019 | Choi | H04W 72/542 |
| 2017/0164405 A1 * | 6/2017 | Kneckt | H04W 92/18 |

(Continued)

FOREIGN PATENT DOCUMENTS

| CN | 112312403 A | 2/2021 |
| WO | 2020251889 A2 | 12/2020 |

OTHER PUBLICATIONS

International Search Report and Written Opinion—PCT/US2022/040871—ISA/EPO—dated Dec. 6, 2022.

(Continued)

*Primary Examiner* — Alpus Hsu
(74) *Attorney, Agent, or Firm* — Arun Swain

(57) ABSTRACT

Systems, devices, and methods for performing coordinated clear channel assessments (CCAs) in a shared radiofrequency band are provided. In one aspect, a method of wireless communication performed by a first wireless communication device includes: receiving a control signal indicating a CCA trigger associated with the first wireless communication device and a second wireless communication device; performing, based on the CCA trigger, a CCA; transmitting, to the second wireless communication device based on the CCA, a first CCA success signal; receiving, from the second wireless communication device, a second CCA success signal; initiating, based on the first CCA success signal and the second CCA success signal, a channel occupancy time (COT); and amplifying and forwarding a communication in the COT.

30 Claims, 11 Drawing Sheets

(56) References Cited

U.S. PATENT DOCUMENTS

| | | | | |
|---|---|---|---|---|
| 2019/0166621 A1* | 5/2019 | Yerramalli | .......... | H04W 74/004 |
| 2020/0107335 A1* | 4/2020 | Xue | ...................... | H04W 16/14 |
| 2020/0245367 A1* | 7/2020 | Sun | .................. | H04W 74/0808 |
| 2020/0260292 A1* | 8/2020 | Xue | .................. | H04W 72/1273 |
| 2021/0266960 A1* | 8/2021 | Lu | .................... | H04W 74/0808 |
| 2021/0274553 A1* | 9/2021 | Xue | .................. | H04W 56/0015 |
| 2021/0282161 A1* | 9/2021 | Sun | ...................... | H04W 72/20 |
| 2022/0159725 A1* | 5/2022 | Liu | .................. | H04W 28/0875 |
| 2022/0167402 A1* | 5/2022 | Liu | ...................... | H04W 28/04 |
| 2022/0174512 A1* | 6/2022 | Rune | .................... | H04B 17/318 |
| 2022/0417989 A1* | 12/2022 | Luo | .................... | H04B 7/15535 |

OTHER PUBLICATIONS

Qualcomm: "Email Discussion Summary for [RAN-R18-WS-non-eMBB-Qualcomm]", 3GPP TSG RAN Rel-18 workshop, RWS-210590, 3rd Generation Partnership Project, Mobile Competence Centre, 650, Route Des Lucioles, F-06921 Sophia-Antipolis Cedex, France, vol. RAN WG3, No. Electronic Meeting, Jun. 28, 2021-Jul. 2, 2021, Jun. 25, 2021, XP052029052, 146 Pages, Sections 5 and 16, p. 116, p. 47, lines 11-16.

* cited by examiner

COORDINATED CLEAR CHANNEL ASSESSMENT (CCA) FOR WIRELESS REPEATERS

TECHNICAL FIELD

This application relates to wireless communication systems, and more particularly to performing coordinated clear channel assessments (CCAs) for communications over a shared radio frequency band (e.g., in a shared spectrum or in an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As use cases and diverse deployment scenarios continue to expand in wireless communication, spectrum sharing technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect, a method of wireless communication performed by a first wireless communication device includes: receiving a control signal indicating a clear channel assessment (CCA) trigger associated with the first wireless communication device and a second wireless communication device; performing, based on the CCA trigger, a CCA; transmitting, to the second wireless communication device based on the CCA, a first CCA success signal; receiving, from the second wireless communication device, a second CCA success signal; initiating, based on the first CCA success signal and the second CCA success signal, a channel occupancy time (COT); and amplifying and forwarding a communication in the COT.

According to another aspect, a method of wireless communication performed by a first wireless communication device includes: transmitting, to a second wireless communication device, a control signal indicating a clear channel assessment (CCA) trigger associated with the first wireless communication device and the second wireless communication device; performing, based on the CCA trigger, a CCA; receiving, from the second wireless communication device, a first CCA success signal; and transmitting, to the second wireless communication device based on the CCA, a second CCA success signal; and initiating, based on the first CCA success signal and the second CCA success signal, a channel occupancy time (COT); and communicating, via the second wireless communication device, a communication in the COT.

According to another aspect, a first wireless communication device includes: a transceiver; and a processor in communication with the transceiver and configured to cause the transceiver to: receive a control signal indicating a clear channel assessment (CCA) trigger associated with the first wireless communication device and a second wireless communication device; perform, based on the CCA trigger, a CCA; transmit, to the second wireless communication device based on the CCA, a first CCA success signal; receive, from the second wireless communication device, a second CCA success signal; initiate, based on the first CCA success signal and the second CCA success signal, a channel occupancy time (COT); and amplify and forward a communication in the COT.

According to another aspect of the present disclosure, a first wireless communication device includes: a transceiver; and a processor in communication with the transceiver and configured to cause the transceiver to: transmit, to a second wireless communication device, a control signal indicating a clear channel assessment (CCA) trigger associated with the first wireless communication device and the second wireless communication device; perform, based on the CCA trigger, a CCA; receive, from the second wireless communication device, a first CCA success signal; and transmit, to the second wireless communication device based on the CCA, a second CCA success signal; and initiate, based on the first CCA success signal and the second CCA success signal, a channel occupancy time (COT); and communicate, via the second wireless communication device, a communication in the COT.

According to another aspect of the present disclosure, non-transitory, computer-readable medium has program code recorded thereon, the program code comprising: code for causing a first wireless communication device to receive a control signal indicating a clear channel assessment (CCA) trigger associated with the first wireless communication device and a second wireless communication device; code for causing the first wireless communication device to perform, based on the CCA trigger, a CCA; code for causing the first wireless communication device to transmit, to the second wireless communication device based on the CCA, a first CCA success signal; code for causing the first wireless communication device to receive, from the second wireless communication device, a second CCA success signal; code for causing the first wireless communication device to initiate, based on the first CCA success signal and the second CCA success signal, a channel occupancy time (COT); and code for causing the first wireless communication device to amplify and forward a communication in the COT.

According to another aspect of the present disclosure, a non-transitory, computer-readable medium has program code recorded thereon, the program code comprising: code for causing the first wireless communication device to transmit, to a second wireless communication device, a control signal indicating a clear channel assessment (CCA) trigger associated with the first wireless communication device and the second wireless communication device; code for causing the first wireless communication device to perform, based on the CCA trigger, a CCA; code for causing the first wireless communication device to receive, from the second wireless communication device, a first CCA success signal; and code for causing the first wireless communication device to transmit, to the second wireless communication device based on the CCA, a second CCA success signal; and code for causing the first wireless communication device to initiate, based on the first CCA success signal and the second CCA success signal, a channel occupancy time (COT); and code for causing the first wireless communication device to communicate, via the second wireless communication device, a communication in the COT.

According to another aspect of the present disclosure, a first wireless communication device includes: means for receiving a control signal indicating a clear channel assessment (CCA) trigger associated with the first wireless communication device and a second wireless communication device; means for performing, based on the CCA trigger, a CCA; means for transmitting, to the second wireless communication device based on the CCA, a first CCA success signal; means for receiving, from the second wireless communication device, a second CCA success signal; means for initiating, based on the first CCA success signal and the second CCA success signal, a channel occupancy time (COT); and means for amplifying and forwarding a communication in the COT.

According to another aspect of the present disclosure, a first wireless communication device, comprising: means for transmitting, to a second wireless communication device, a control signal indicating a clear channel assessment (CCA) trigger associated with the first wireless communication device and the second wireless communication device; means for performing, based on the CCA trigger, a CCA; means for receiving, from the second wireless communication device, a first CCA success signal; and means for transmitting, to the second wireless communication device based on the CCA, a second CCA success signal; and means for initiating, based on the first CCA success signal and the second CCA success signal, a channel occupancy time (COT); and means for communicating, via the second wireless communication device, a communication in the COT.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
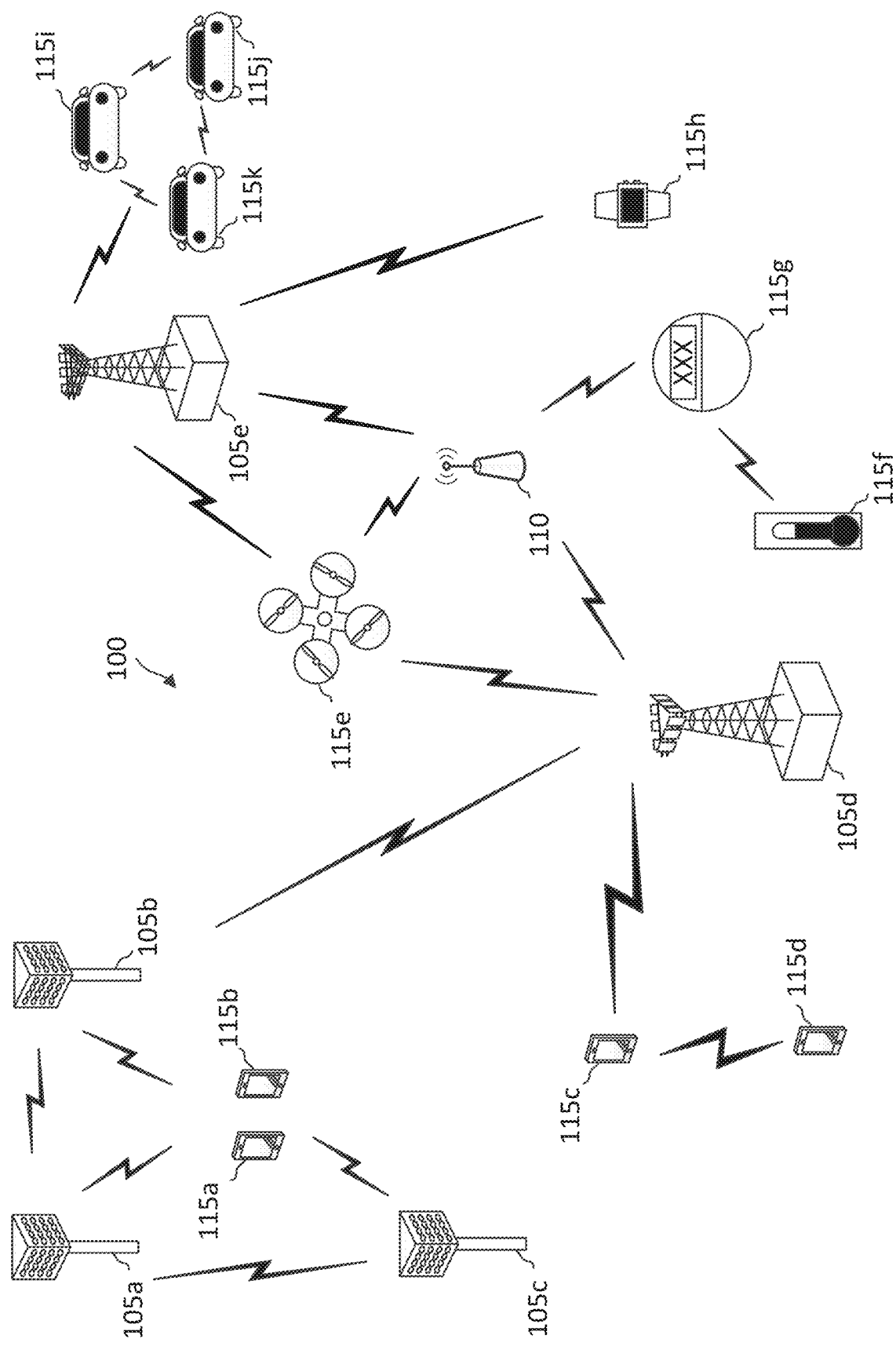
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 frequency bands at 7 GHz or lower (e.g., between about 410 MHz to about 7125 MHz). FR2 bands includes frequency bands in mmWave ranges between about 24.25 GHz and about 52.6 GHz. The mmWave bands have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Channel access in an unlicensed band may be controlled by regulations. For instance, some regulations may mandate a certain channel access scheme, such as listen-before-talk (LBT), for sharing an unlicensed band. In particular, a transmitting node (e.g., a base station (BS) or a user equipment (UE)) may employ an LBT procedure to contend for a transmission opportunity (TXOP) in a shared channel of the unlicensed band. When the LBT results in an LBT pass or success (the transmitting node wins the contention), the wireless communication device may access the shared radio frequency band to transmit data. When the LBT result in an LBT fail, the transmitting node may refrain from transmitting in the shared radio frequency band. In some aspects, the LBT may be based on energy detection. For instance, the LBT may result in a pass or success when signal energy measured from the channel is below an energy detection (ED) threshold. Conversely, the LBT may result in a failure when signal energy measured from the channel exceeds the ED threshold. In some aspects, the LBT may be based on signal detection. For example, the LBT may result in a pass or success when a channel reservation signal (e.g., a predetermined preamble signal) is not detected in the channel Conversely, the LBT may result in a failure when a channel reservation signal is detected in the channel. A TXOP may also be referred to as channel occupancy time (COT). An LBT may also be referred to as a clear channel assessment (CCA). In some aspects, the shared radio frequency band may be referred to as an unlicensed band, shared frequency band, or shared channel, for example. However, it will be understood that the schemes and mechanisms described herein may apply to any shared radio frequency band.

As used herein, the terms "LBT pass," "LBT success," "CCA pass," and/or "CCA success" may refer to a clearance for transmission in a shared radio frequency band and/or a wireless communication device winning a contention in the shared radio frequency band. The clearance may be based on a received signal measurement of the channel being below an ED threshold, the lack of a channel reservation signal present in the shared radio frequency band, and/or one or more other factors. Conversely, the terms "LBT failure," and/or "CCA failure" may refer to a failure in obtaining a clearance for transmission in a shared radio frequency band (e.g., the channel is busy or occupied) and/or a wireless communication device failing to win a contention in the shared radio frequency band. The detection of the LBT or CCA failure may be based on a received signal measurement of the channel being above an ED threshold, the presence of a channel reservation signal present in the channel, and/or one or more other factors.

An LBT may be in a variety of modes. An LBT mode may be, for example, a category 1 (CAT1) LBT, a category 2 (CAT2) LBT, a category 3 (CAT3) LBT, or a category 4 (CAT4) LBT. A CAT1 LBT may refer to a no LBT mode, where no LBT is to be performed prior to a transmission. A CAT2 LBT may refer to an LBT without a random backoff period. For instance, a transmitting node may determine a channel measurement in a time interval and determine whether the channel is available or not based on a comparison of the channel measurement against an ED threshold. A CAT4 LBT may refer to an LBT with a random backoff and/or a variable contention window (CW). For instance, a transmitting node may draw a random number R and backoff for R number of contention slots or CCA slots. The node may transmit in the channel after the random backoff if the channel remains clear (idle) during each of the contention slots or CCA slots. The random backoff may also be referred to as a countdown.

Further, LBT can be used for asynchronous channel access or synchronous channel access. In an asynchronous channel access system, such as an IEEE 802.11 (WiFi) system, a wireless communication device may access the channel at any time. In other words, a wireless communication device may perform an LBT to contend for a TXOP or COT at any time and may start a transmission upon wining the contention, for example, as soon as completing a successful LBT. On the other hand, in a synchronous channel access system, such as NR-unlicensed (NR-U), a wireless communication device (e.g., a BS or a UE) may access the channel at fixed time instants (e.g., periodic time instants). In particular, transmissions in NR-U may start at a slot boundary. Thus, while an NR-U device (e.g., a BS or a UE) may perform an LBT and win the contention, the NR-U device may or may not start a transmission immediately upon winning the contention depending on the LBT completion time. For example, when the LBT completes at a point of time within a slot, the NR-U device may not be able to start a transmission immediately. Instead, the NR-U device may wait until a next slot boundary to start the transmission. Accordingly, there can be a transmission gap (a silence period) between the completion of the LBT and the start of the transmission.

In some aspects, a network may employ relay devices to extend coverage and capacity. The relay devices may include repeaters configured to receive and forward communications between communicating nodes (e.g., a BS and a UE, a UE and a UE, a BS and a BS, or otherwise) in the network. For example, a network may include a repeater configured with side control information to facilitate intelligent amplify-and-forward operation in the network with TDD access and multi-beam operation. The side control information may include timing parameters (e.g., slot, symbol boundaries, on/off scheduling, etc.) in some aspects. The side control information may be received by the repeater via broadcast channels, in some aspects. In other aspects, the side control information may be configured or controlled by a network control node via an established control interface. In some instances, a repeater that is configured to operate based on side control information may be referred to as a smart repeater. In other aspects, the repeater may not be configured to operate based on side control information.

When operating in unlicensed bands, both the initiating node (e.g., a BS) and the repeater may perform an LBT before using an amplify-and-forward operation in a COT. In some aspects, a wireless node (e.g., BS or UE) may initiate the COT, and the repeater may perform an additional LBT procedure within the COT. However, this approach may reduce the effective duration of the COT and waste the COT budget. The wasted COT budget may limit data speeds within the shared frequency band when using a repeater. The approach may also delay communications between the communicating nodes. The delayed communications may increase latency and degrade user performance. These effects may be especially noticeable if the COT-initiating node and the repeater are performing an LBT CAT4 since LBT CAT4 may have a relatively larger duration than other LBT procedures.

The present disclosure describes methods and mechanisms for coordinated clear channel assessments (CCAs), such as LBTs, performed by a communicating node (e.g., BS or UE) and a relay device, such as a repeater. According to some aspects of the present disclosure, an initiating node or control node may initiate a coordinated CCA by transmitting a control signal indicating a trigger for a coordinated CCA. Based on the trigger, the repeater and the COT-initiating node may perform CCAs during time periods that at least partially overlap. For example, the CCAs may begin at the same time or may be offset from each other by a configured or indicated CCA offset such that at least a portion of the CCAs overlap. Based on the CCA performed by the COT-initiating node passing or being successful, the COT-initiating node transmits a success signal to the repeater. Similarly, based on the CCA performed by the repeater passing or being successful, the repeater also transmits a success signal to the COT-initiating node. The success signals may be transmitted at a same time or at different times. The COT-initiating node may initiate communications in the COT based on transmitting a success signal and receiving a success signal. In other aspects, if the COT-initiating node or the repeater detects interference during the CCA, a restart indication may be transmitted to the other device to cancel the previously transmitted success signal.

The COT-initiating node may be configured to monitor for the success signals during the CCA and/or after the CCA. For example, the COT-initiating node may be configured with candidate indication signal occasions or time resources.

The candidate indication signal occasions may be periodic. If the COT-initiating node decodes an occasion and detects a success signal from the other device, the COT-initiating node treats the occasion as idle for the CCA. In another aspect, the repeater may be configured to monitor for the success signals during the CCA and/or after the CCA. For example, the repeater may be configured with candidate indication signal occasions or time resources. The candidate indication signal occasions may be periodic. If the repeater decodes an occasion and detects a success signal from the other device, the repeater treats the occasion as idle for the CCA.

The methods, devices, and systems described herein allow for a COT-initiating node (e.g., BS, UE) to communicate in a shared frequency band with a repeater while limiting delays involved with performing CCAs at each of the COT-initiating node and the repeater. The mechanisms described herein also allow for coordinated CCA signaling (e.g., success signals, restart indications) without interrupting the CCA procedures of the other device. Accordingly, the COT budget may be maintained and potential delays associated with the co-dependent CCAs may be reduced or eliminated. Thus, network performance and user experience benefit from the improved coverage provided by the repeater in the shared frequency band, and potential inefficiencies associated with amplify-and-forward operations of the repeater in the shared band are eliminated, reduced, or mitigated.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, and 105e) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The network 100 also includes a repeater 110, which is configured to communicate with one or more of the BSs 105 and/or the UEs 115. For example, the repeater 110 may be configured to amplify and forward communications from a BS 105 to a BS 105, from a UE 115 to a UE 115, from a BS 105 to a UE 115, and/or from a UE 115 to a BS 105.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105. The BS 105 may be a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e. Other machine type devices, such as the UE 115f (e.g., a thermometer), the UE 115g (e.g., smart meter), and UE 115h (e.g., wearable device) may communicate through the network 100 either directly with BSs, such as the macro BS 105e, or in multi-action-size configurations by communicating with another user device such as the repeater 110 which relays its information to the network, such as the UE 115f communicating temperature measurement information to the smart meter, the UE 115g, which may then be reported to the network through the repeater 110. The network 100 may also provide additional network efficiency through dynamic, low-latency TDD/FDD communications, such asV2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared radio frequency band (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared radio frequency band (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 may be in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared radio frequency band. The shared radio frequency band may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared radio frequency band as discussed above. In some aspects, a serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

In other aspects, the network 100 may employ a relay node or repeater device to expand coverage areas of BSs 105. The relay nodes may be configured to receive and forward communications between communicating nodes, such as between a BS 105 and a UE 115. The relay nodes may be configured with side control information to facilitate communications, in some aspects. The relay devices may be configured to operate in unlicensed bands, similar to the BSs 105 and UEs 115.

Figure 2:
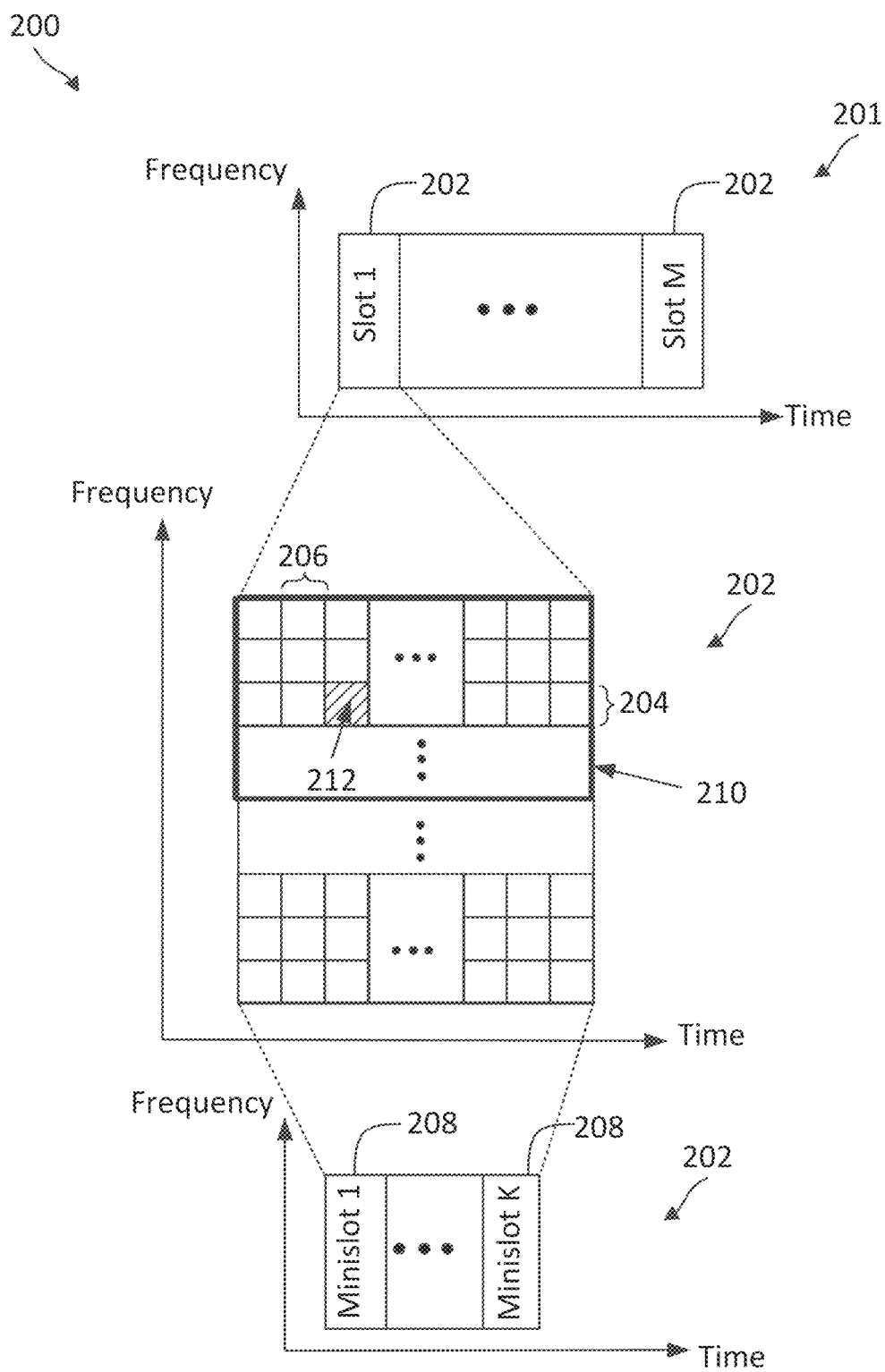
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds.

The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 may be formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols).

In some aspects, the network 100 may be an NR-U network and the BSs 105 and the UEs 115 may operate in a synchronous channel access mode and may utilize the radio frame structure 200 for transmissions and/or receptions. In particular, a BS 105 or a UE 115 may start a transmission at a slot boundary (e.g., the start of a slot 202), and the BS 105 or the UE 115 may monitor for a reception at the slot boundary. When the network 100 operates over a shared radio frequency band, a BS 105 or a UE 115 may perform an LBT or procedure to contend for a TXOP or COT in the channel. As explained above, for a device with synchronous channel access, the device may have to wait for a gap duration before starting a transmission upon completing a successful LBT (with a contention win), for example, when the LBT completes before a next available transmission starting point (a next slot boundary).

Figure 4:
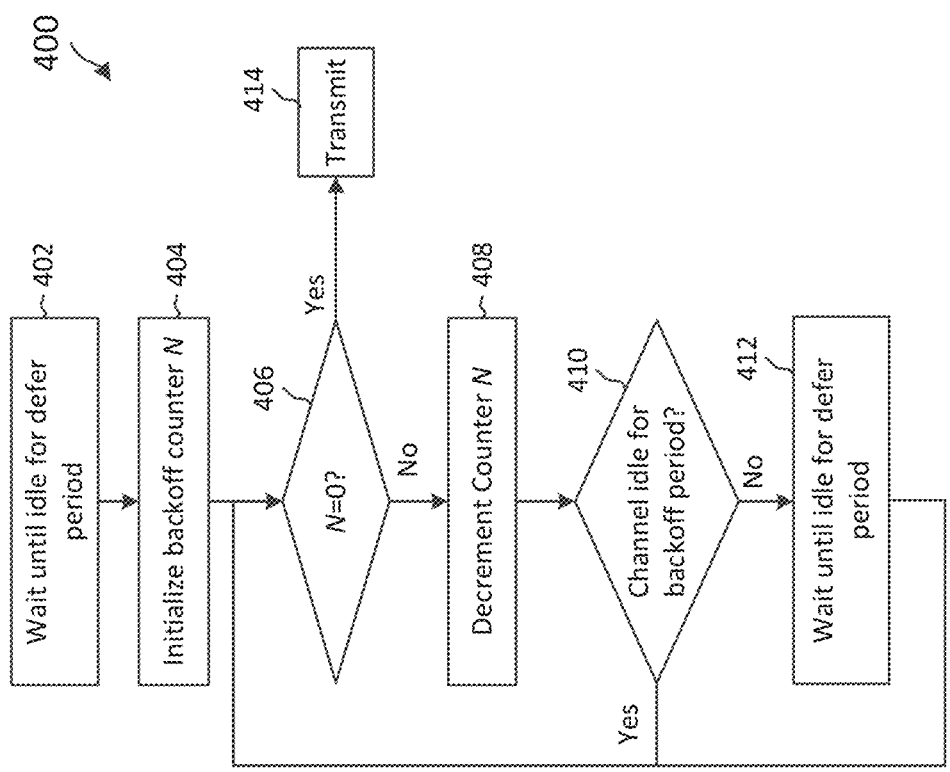
FIG. 4 is a flow diagram illustrating the LBT procedure shown in FIG. 3 according to some aspects of the present disclosure.
Figure 3:
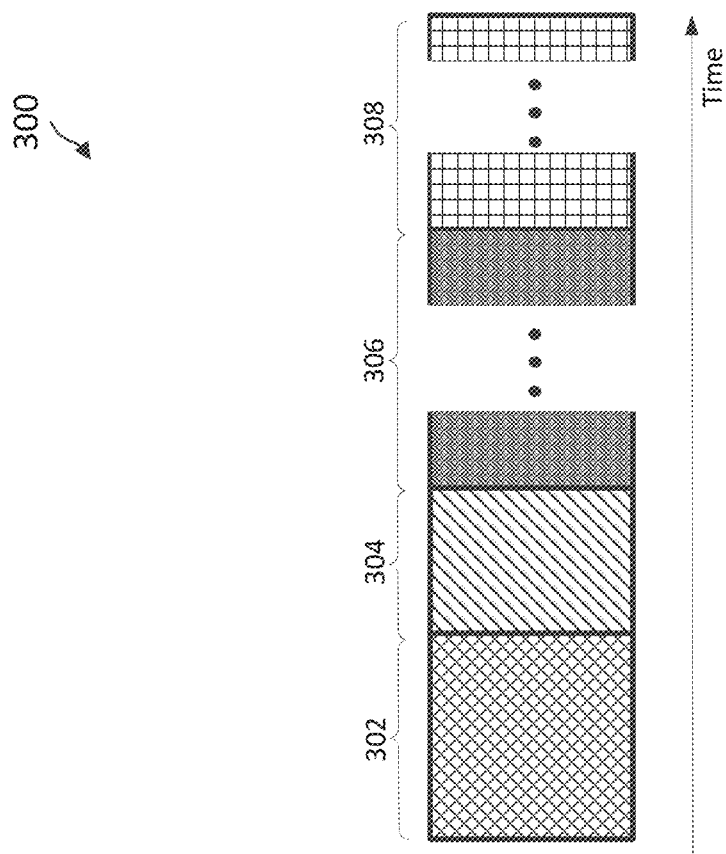
FIG. 3 is a timing diagram illustrating a listen-before-talk (LBT) procedure with a random backoff according to some aspects of the present disclosure.

FIGS. 3 and 4 illustrate a channel access scheme with a counter-based backoff period according to some aspects of the present disclosure. In this regard, FIG. 4 illustrates the steps of the channel access scheme 400, and FIG. 3 illustrates the timing structure 300 of the channel access scheme 400. The scheme 400 may be employed by a wireless communication device such as a UE 115 in a network such as the networks 100 for communications. For example, the wireless communication device may perform an LBT by obtaining signal energy measurements over an LBT duration. The LBT duration may be based on an initial defer period and a counter-based backoff period or countdown. In FIG. 3, the x-axis represents time in some arbitrary units.

Referring to FIGS. 3 and 4, in the scheme 400, a wireless communication device (e.g., a UE 115) may perform a CAT4 LBT in a shared radio frequency band (e.g., a FR1 band, a FR2 band, FR2X band, or any suitable radio frequency band) to contend for a COT for a transmission, assist a BS with channel access, and/or for any other suitable purpose. The wireless communication device may perform sensing (e.g., an LBT or CCA) in the channel after a gap period 302. The gap period 302 may be based on a network configuration. Following the gap period 302, the wireless communication device senses a channel for an initial defer period 304 at action 402. For instance, action 402 may include the wireless communication device measuring signal energy in the channel during the defer period 304. When the wireless communication device detected a measured signal energy above an ED threshold, the channel is busy. In some instances, the ED threshold may be regulated by regulations. In some other instances, the ED threshold may be configured to achieve a certain channel sensing range. The wireless communication device may continue with channel sensing or CCA during the defer period 304. In some aspects, the defer period 304 may have a fixed duration, for example, about 16 microseconds (μs) long. In another aspect, the defer period 304 may include an initial fixed defer period (e.g., 16 μs), and one or more priority-based defer periods. For example, the duration of the defer period 304 may be defined as $T_d=16$ μs+m*9 μs, where m is based on a priority class (e.g., channel access priority class (CAPC)) associated with the channel access scheme 400. For example, m may be an integer value between 1 and 4 indicated by a BS for the LBT procedure. The value of m may be indicated in DCI via a channel access entry indicating an entry index corresponding to a preconfigured channel access table.

At action 404, the wireless communication device initializes a backoff counter N. The backoff counter N may be a randomly generated integer. N may be selected or generated by the wireless communication device. The value of N may range between 0 and a maximum value, where the maximum value is associated with an indicated contention window (CW).

At action 406, the wireless communication device determines whether the value of N=0. If N=0, the wireless communication device proceeds to transmit a UL communication at action 414. In some aspects, if N=0, action 414 may include acquiring a channel occupancy time (COT), which is illustrated in FIG. 3 as the COT 308. If N≠0, the wireless communication device decrements the counter value N by one at action 408, and again senses the channel for a backoff period at action 410. In one example, the backoff period may be 9 μs. However, the backoff period may be any suitable value, including 4 μs, 5 μs, 8 μs, or any other suitable value, both greater or smaller. In some aspects, action 410 includes comparing signal energy measurements (e.g., reference signal received power (RSRP)) to an energy detection (ED) threshold. Accordingly, the channel may be considered idle if the signal energy measurements satisfy the ED threshold for the backoff period.

If the wireless communication device determines that the channel is idle during the backoff period at action 410, the wireless communication device returns to action 406 to determine whether the decremented counter value N=0. The wireless communication device may repeat the loop including actions 406, 408, and 410 until the counter value N=0. The loop of actions 406, 408, and 410, which is based on the randomly-generated value N, is shown in FIG. 3 as a random backoff duration 306. If the wireless communication device determines that the channel is not idle during the backoff period, the wireless communication device may again perform channel sensing during a defer period. The defer period may be the same defer period described with respect to action 412.

In some aspects, multiple devices may perform LBT procedures similar or identical to the method 400 illustrated above. For example, when communicating in a shared or unlicensed frequency band using a repeater device, both the COT-initiating node (e.g., BS, UE) and the repeater may perform an LBT procedure before communicating in the COT. However, performing the LBT procedures successively may increase delays and communication latency, and may waste COT budget. The present disclosure describes methods, systems, and devices for performing coordinated CCAs (e.g., LBTs), such that COT-initiating nodes and relay devices (e.g., smart repeaters) can perform the CCAs in time periods that at least partially overlap.

Figure 5A:
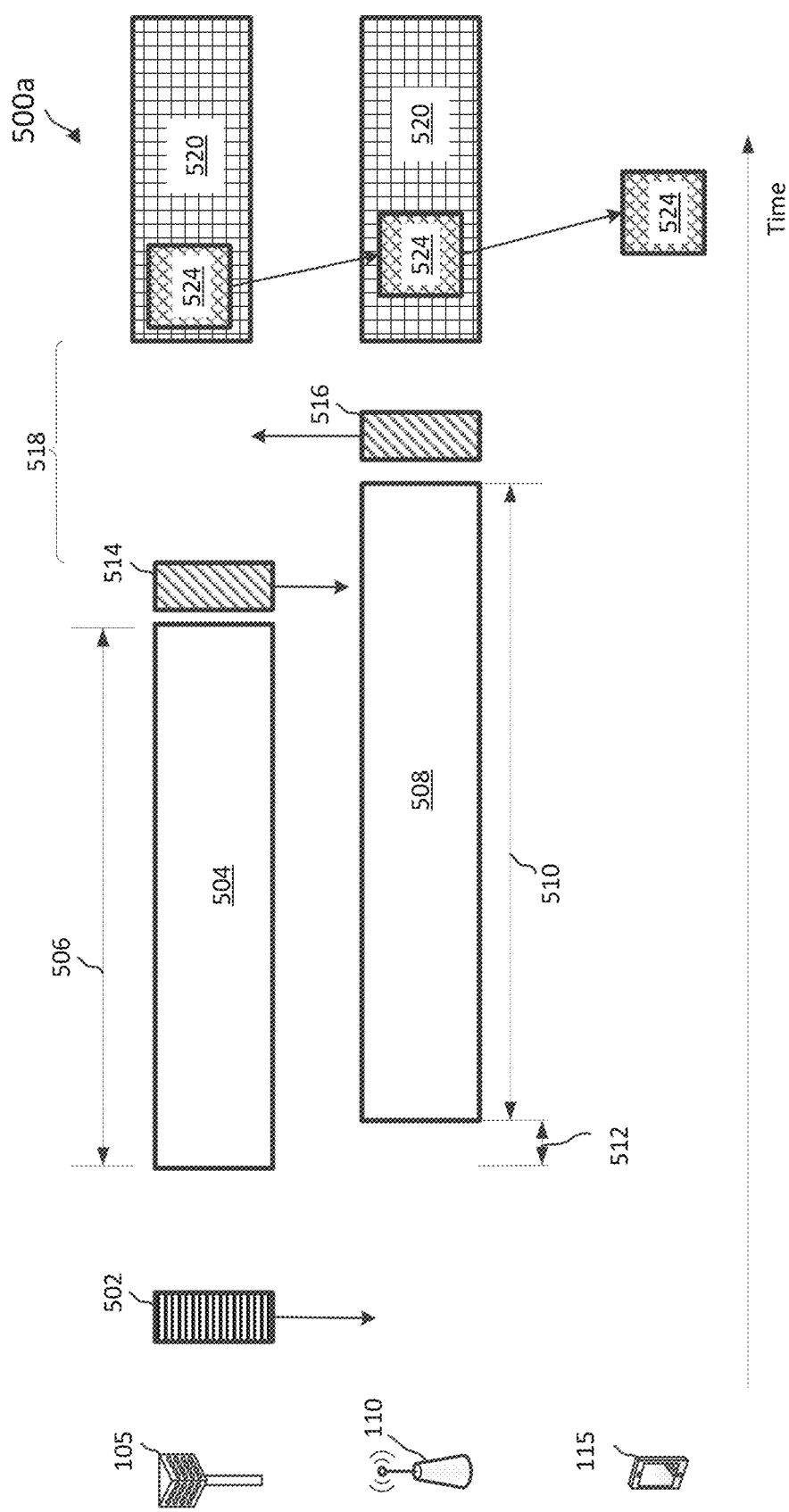
FIG. 5A is a timing diagram illustrating a method for performing a coordinated CCA with a wireless repeater device according to some aspects of the present disclosure.
Figure 5B:
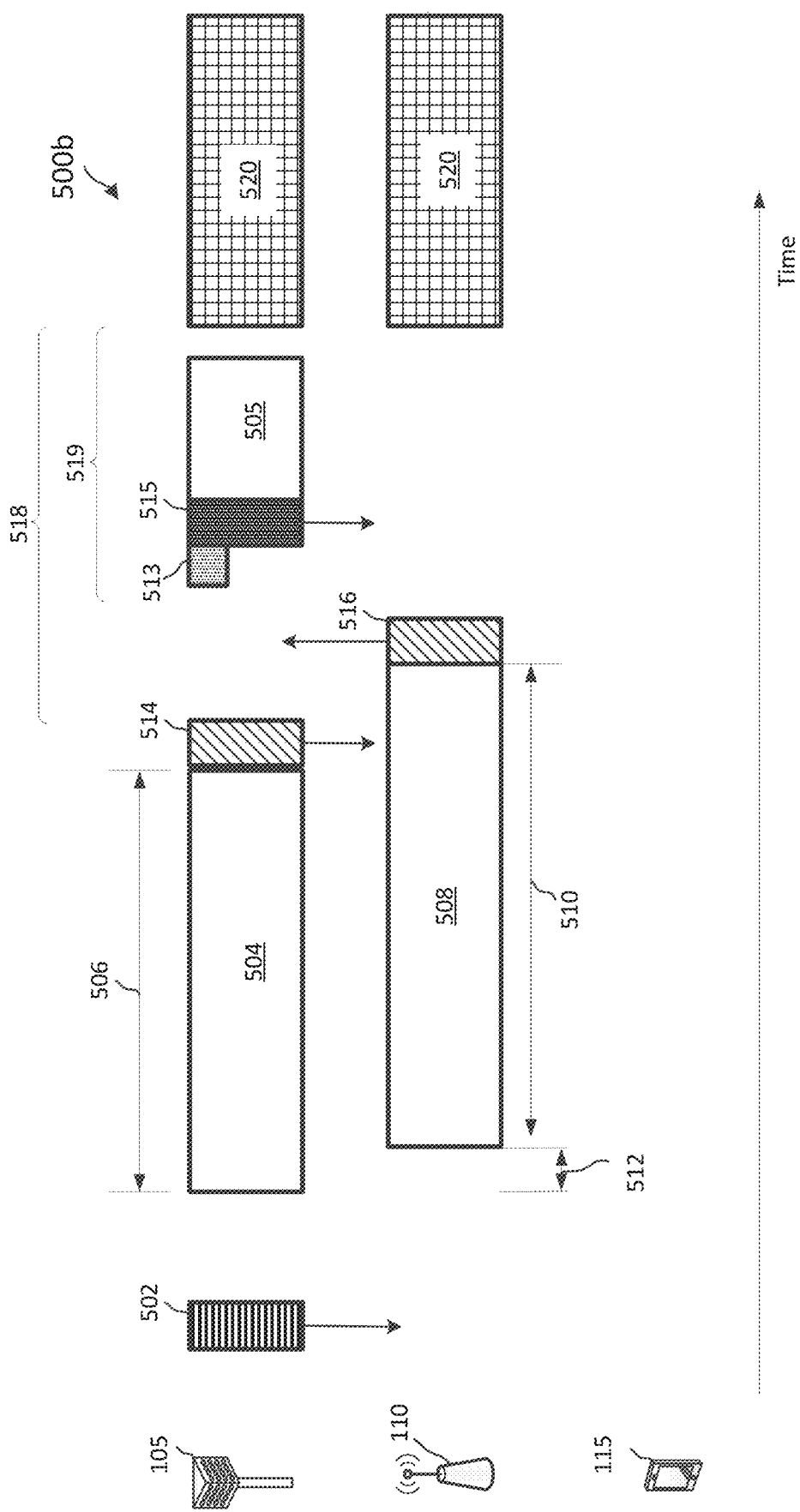
FIG. 5B is a timing diagram illustrating a method for performing a coordinated CCA with a wireless repeater device according to some aspects of the present disclosure.
Figure 5C:
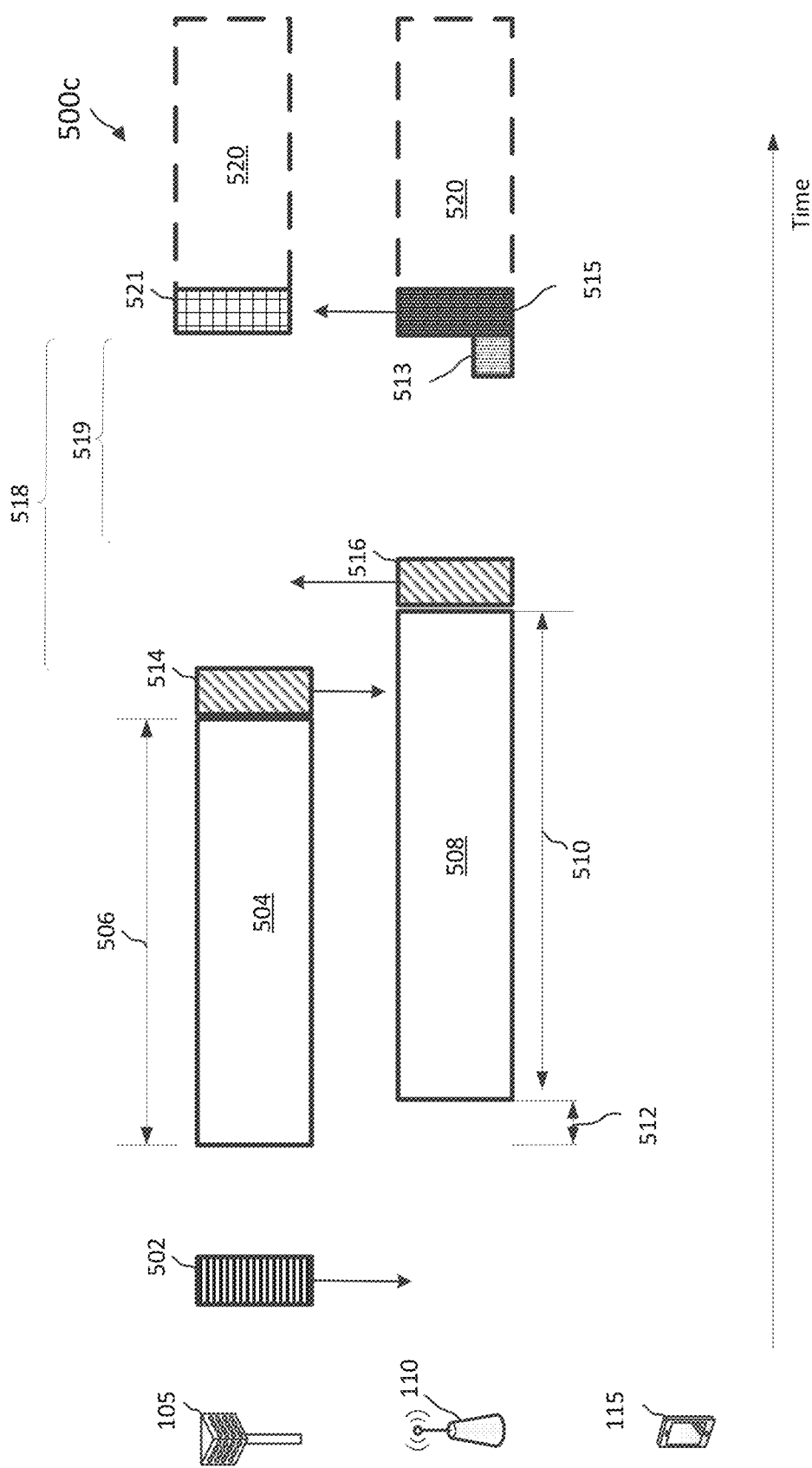
FIG. 5C is a timing diagram illustrating a method for performing a coordinated CCA with a wireless repeater device according to some aspects of the present disclosure.

FIGS. 5A-5C are flow diagrams illustrating schemes for performing coordinated LBTs, according to aspects of the present disclosure. The schemes 500a-500c may be performed by a BS 105, a repeater or relay device 110, and a UE 115. However, it will be understood that the schemes 500a-500c may be performed by other combinations of wireless communication devices, including BS-to-BS communications, and UE-to-UE communications. For example, in some aspects, the schemes 500a-500c may be performed by the BS 105, the repeater 110, and a second BS. In other aspects, the schemes 500a-500c may be performed by the UE 115, the repeater 110, and a second UE. Referring to FIGS. 5A-5C, the BS 105 may be one of the BSs 105 in the network 100, and the UE 115 may be one of the UEs 115 in the network 100. The repeater 110 may be a smart repeater, in some aspects. The repeater 110 may be configured to amplify and forward communications between the BS 105 and the UE 115. The repeater 110 may be configured to communicate in an unlicensed or shared frequency band. The repeater 110 may be configured to communicate based on side control information. The side control information may include timing information associated with the relay functions of the repeater 110. For example, the repeater 110 may be configured with on/off scheduling, spatial information for beam management, time domain duplexing configurations, and/or any other side information. In the schemes 500a-500b, the BS 105 and the repeater 110 may be configured to perform a coordinated LBT. The coordinated LBT may involve performing respective LBTs over time periods that at least partially overlap. Accordingly, the LBTs can be performed concurrently. Concurrent LBTs performed by both the BS 105 and the repeater 110 may increase the efficiency of initiating COTs in a shared frequency band.

In the schemes 500a-500c, the BS 105 and the repeater 110 may perform LBTs 504, 508 based on a control signal 502. Referring generally to FIGS. 5A-5C, the control signal 502 may be transmitted by the BS 105, or by a different node, such as a control node initiating the coordinated LBT. The control signal 502 includes or indicates a trigger to the BS 105 and/or to the repeater 110 for performing an LBT. In some aspects, the control signal includes 502 at least one of a downlink control information (DCI), a radio resource control (RRC) message, and/or a media access control-control element (MAC-CE). In some aspects, the control signal 502 may include a field carrying one or more bits indicating the LBT trigger. In some aspects, the control signal 502 includes or indicates a channel access configuration. The control signal 502 may include an indication of an entry index of a channel access table carried in DCI. Each row or entry of the channel access table may indicate a type of CCA to be performed. For example, the control signal 502 may indicate the first wireless communication device to perform an LBT CAT2, LBT CAT3, or LBT CAT4. Each row or entry of the table may also indicate a cyclic prefix extension index, and/or a channel access priority class (CAPC) associated with the indicated type of CCA.

In some aspects, the control signal 502 may indicate an LBT configuration for the coordinated LBT. In other aspects, the BS 105 may transmit an LBT timing configuration in a different control signal. The LBT configuration may specify a defer period, a backoff counter value, and/or any other suitable LBT timing parameter. In one aspect, the LBT configuration may indicate the defer period as 16 μs+m*9 μs, where m is associated with the priority class (e.g., CAPC) of the scheduled UL communication. The random backoff period may involve an additional period of N*9 μs, where N is an integer. In some aspects, N may be a random integer determined or selected by the first wireless communication device. In another aspect, N may be a non-random value that is assignable based on an indication from the BS 105. For example, in some aspects, the repeater 110 may receive the indication of the entry or row of the channel access table. In some aspects, the entry or row indicates the value N.

In other aspects, the LBT configuration may include or indicate other parameters of a coordinated LBT. For example, the LBT configuration may include or indicate a time offset for the beginning of the LBT as performed by the BS 105, and the beginning of the LBT as performed by the repeater 110. In some aspects, the time offset may indicate the BS 105 and the repeater 110 to start the LBT at the same time, or with a fixed time offset between them. The time offset parameter may indicate a number of μs, a number of slots, or a number of symbols, for example. In another aspect, the LBT configuration may include or indicate a maximum time limit for the coordinated LBT. For example, the maximum time limit may indicate a maximum time at which the BS 105 and/or the repeater 110 will cease or cancel the LBT if the LBT is not yet complete. In some aspects, the LBT configuration may indicate a type of the LBT (e.g., LBT CAT2, LBT CAT3, LBT CAT4). In another aspect, the LBT configuration may indicate a sensing beam configuration. For example, the LBT configuration may indicate the repeater 110 to sense in all or a portion of available beam directions, including front-haul beam directions toward the BS 105, and service beam directions toward other wireless communication devices (e.g., UE 115) in the network. In some aspects, the sensing beam configuration may indicate one or more beam directions and/or TCI states for performing the LBT. In another aspect, the LBT configuration may indicate an initial counter value for an LBT CAT4. For example, the LBT configuration may indicate a non-random backoff counter value that can be used by the repeater 110 instead of a random backoff counter value. In some aspects, the LBT configuration may include or indicate a same counter value for both the BS 105 and the repeater 110 such that the duration of the LBTs performed by the BS 105 and the repeater 110 may be the same. In other aspects, the LBT configuration may indicate different counter values for the BS 105 and the repeater 110. In another aspect, the LBT configuration may include or indicate one or more parameters for an indication signal. For example, the LBT configuration may indicate a signal index, candidate resources for transmitting and/or receiving success signals or restart signals, and or any other suitable signal parameter. In one example, the LBT configuration may indicate that the indication signal spans 1 sensing slot, 2 sensing slots, 1 symbol, 2 symbols, 4 symbols, 7 symbols, or any other suitable time measurement. In another aspect, the LBT configuration indicates a first sensing slot for an indication signal transmission, and a different second sensing slot for an indication signal reception. The repeater 110 and/or the BS 105 may perform the LBT based on the LBT configuration described above. The LBT configuration may include an LBT timing configuration.

Based on the control signal 502, the BS 105 performs a first LBT 504 over a first duration 506, and the repeater 110 performs a second LBT 508 over duration 510. The beginning of the second LBT 508 may be offset from the beginning of the first LBT 504 by an offset 512. In some aspects, the control signal 502 may indicate the offset 512. In other aspects, the repeater 110 may receive a different control signal indicating the offset 512. In some aspects, the repeater 110 may determine or select the offset 512. For example, the repeater 110 may select a random value for the offset 512. In other aspects, the BS 105 and the repeater 110 begin the LBTs 504, 508 with no offset.

Referring to FIG. SA, if the LBTs 504, 508 pass, then the BS 105 and the repeater 110 may transmit respective success signals 514, 516. The BS 105 and the repeater 110 may be configured to initiate a COT 520 (e.g., communicate in the COT 520) based on communicating both success signals 514, 516. In some aspects, the BS 105 may be configured to perform additional channel sensing during a gap period 518 between communicating the success signal 514 and initiating the COT 520. In some aspects, the additional channel sensing includes measuring signal energy or signal power (e.g., RSRP), and comparing the signal measurements to a configured threshold (e.g., ED threshold). Further, the repeater 110 may also be configured to perform additional channel sensing during a gap period between communicating the success signal 516 and initiating the COT 520. If either the BS 105 or the repeater 110 determines that the channel is busy in the gap period 518, the BS 105 or the repeater 110 may transmit a restart indication to the other of the repeater 110 or the BS 105 to cancel the previously transmitted success signal and.

In some aspects, the BS 105 and the repeater 110 may be configured to monitor for the success signals 514, 516, during the LBTs 504, 508, and/or during the gap period 518. For example, the BS 105 and the repeater 110 may be configured with candidate success signal occasions or time resources. For example, in some aspects, the schemes 500a-500c may include receiving a coordinated LBT configuration indicating time and frequency resources for the candidate success signal occasions. The LBT configuration may be communicated or indicated via one or more RRC messages, MAC-CEs, and/or DCIs. In other aspects, the candidate success signal occasions may be preconfigured. The BS 105 and the repeater 110 may be configured to perform blind decoding in the candidate success signal occasions to determine whether a success signal has been received. If a success signal was received during a candidate sensing signal occasion, the BS 105 and/or the repeater 110 may treat the candidate sensing signal occasion as idle. Accordingly, the communication of the success signal may not cause an LBT fail. The candidate success signal occasions may occur during the LBTs 504, 508, and/or during the gap period 518.

After the gap period 518, the BS 105 may initiate the COT 520 and transmit DCI 524 to the UE 115 via the repeater 110 in the COT 520. The DCI 524 may indicate that the COT 520 was acquired and/or schedule DL/UL communications between the BS 105 and UE 115.

Referring to FIG. 5B, in the scheme 500b, the BS 105 and/or the repeater 110 may detect interference either during the LBT or the channel sensing in the gap period. The BS 105 and/or the repeater 110 may transmit, based on the detected interference, a restart signal to the other of the repeater 110 or the BS 105 and restart the corresponding LBT. Transmitting the restart signal may cancel the previously transmitted success signal. In FIG. 5B, following the communication of both success signals 514, 516, the BS 105 detects interference 513 exceeding a configured threshold in the gap period 518, and transmits a restart indication 515 to the repeater 110 based on the detected interference. The BS 105 then restarts the LBT, which may include performing an additional LBT 505. The additional LBT 505 may be performed over a same duration as the duration 506, or a different duration. For example, the BS 105 may perform the additional LBT 505 after the restart signal 515 based on a different random backoff period, or the same random backoff period of the LBT 504. The repeater 110, which is performing additional channel sensing during a gap period 519, detects the restart signal 515. Based on the restart indication 515, the repeater 110 cancels the previously received success signal 514, and monitors for an additional success signal before commencing communications in the COT 520. In this regard, the BS 105 and/or the repeater 110 may be configured to monitor for restart indications during the LBTs 504, 508 and/or during the gap periods 518, 519. Similar to monitoring for the success signals, the BS 105 and the repeater 110 may be configured with candidate restart indication occasions. For example, the schemes 500a-500c may include receiving an LBT configuration indicating candidate indication signal occasions or resources for transmitting and/or receiving indication signals, such as success signals and restart signals.

The repeater 110 may be configured to perform a blind decoding of each candidate restart indication occasion to determine if a restart indication was received. In some aspects, the BS 105 may be configured with a set of candidate indication occasions, and monitor for both success signals and restart indications based on the candidate indication occasions. In other aspects, the BS 105 may not be configured to monitor for a restart indication. For example, the BS 105 may be configured to transmit any suitable signal that will result in the other node failing the LBT or the additional channel sensing during the gap period. In another aspect, the repeater 110 may be configured to perform a blind decoding of each candidate restart indication occasion to determine if a restart indication was received. In some aspects, the repeater 110 may be configured with a set of candidate indication occasions, and monitor for both success signals and restart indications based on the candidate indication occasions.

Referring to FIG. 5C, there may be a latency between detecting interference and transmitting a restart indication. The latency period may be based on blind decoding for a success signal and/or restart indication, as explained above. In this regard, in the scheme 500c, the repeater 110 detects interference 513 during a gap period 519, and transmits a restart indication 515 based on the detected interference 513. Because of the latency period, the repeater 110 transmits the restart indication 515 during the COT 520. The BS 105 receives the restart indication 515, and cancels the COT 520 after a brief period 521 in which the COT was initiated. Based on the restart indication 515, the BS 105 may monitor for a second success signal from the repeater 110 before initiating a COT. In another aspect, the BS 105 and the repeater 110 may restart the coordinated LBT. Before initiating a COT. In some aspects, there may be a latency period after detecting a signal indicating a busy channel. For example, the latency period may be based on the blind decoding operation for the success signal described above. After cancelling the COT 520, the BS 105 and the repeater 110 may restart the LBTs 504, 508, and transmit respective success signals if the restarted LBT results in a pass. For example, the BS 105 and the repeater 110 may perform the scheme 500a following the scheme 500c. Accordingly, in some aspects, the scheme 500c may involve communicating three, four, five, six, or more success signals in response to detecting busy signals and/or interference and communicating restart indications.

Figure 6:
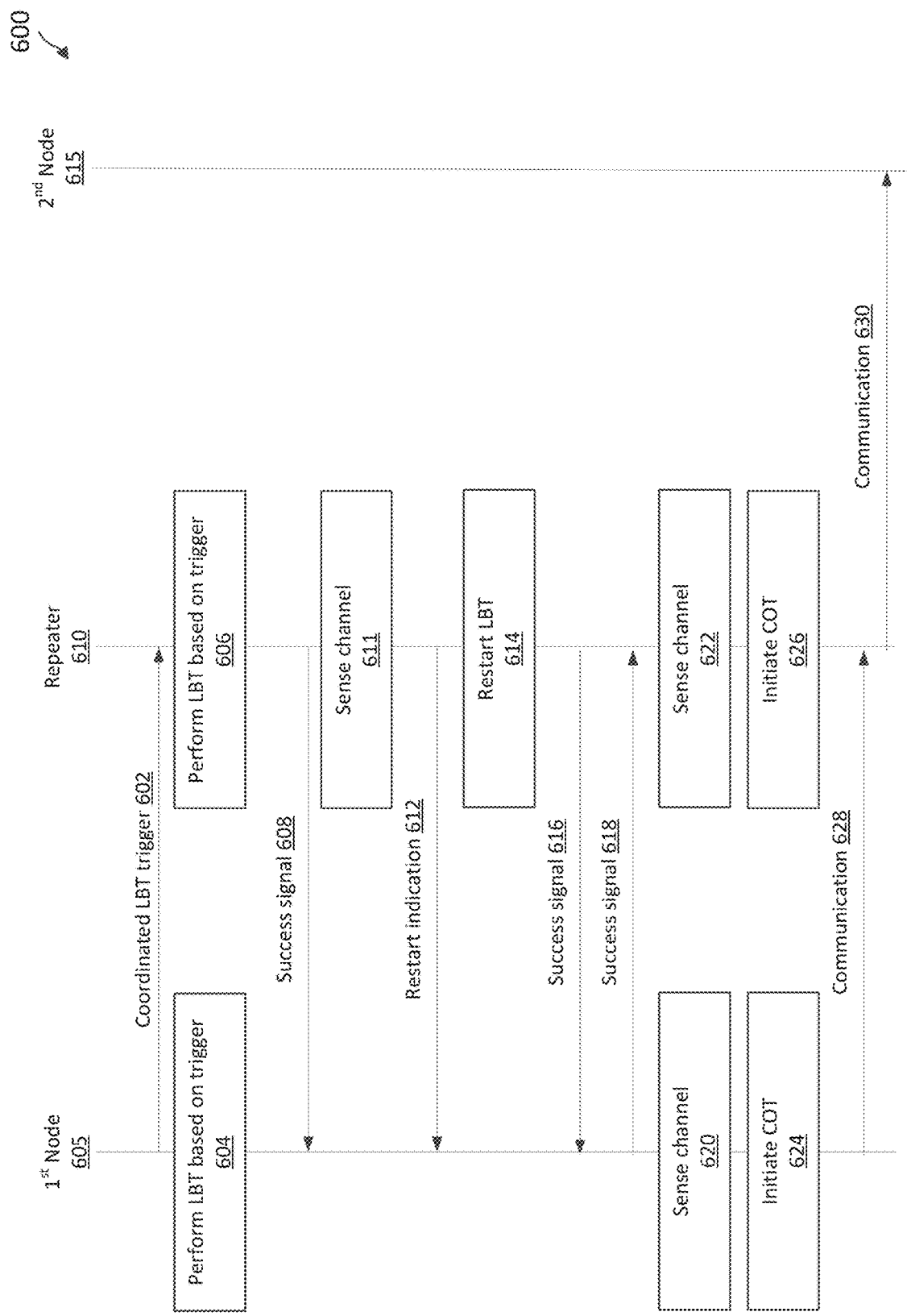
FIG. 6 is a signaling diagram illustrating a method for performing a coordinated LBT according to some aspects of the present disclosure.

FIG. 6 is a signaling diagram of a method 600 for performing a coordinated LBT, according to aspects of the present disclosure. The method 600 may be performed by a first node 605, a repeater 610, and a second node 615. The first node 605 may be a BS, such as one of the BSs 105 in the network 100. The repeater 610 may include a smart repeater or relay device. The repeater 610 may be configured to perform amplify-and-forward operations for communications between the first node 605 and the second node 615. The second node 615 may be a BS or a UE, for example. In one aspect, the second node 615 may be one of the UEs 115 in the network 100. The method 600 may include aspects of the schemes 400, and 500a-500c described above. In this regard, the method 600 may include communicating a control signal indicating a trigger to perform a coordinated LBT. For example, the control signal may indicate the repeater 610 to perform an LBT in a time period that at least partially overlaps a time period in which the first node 605 is performing an LBT. The method may include monitoring for success signals or indications from the other node (e.g., first node 605 or repeater 610), and initiating a COT in response to transmitting and receiving success signals.

At action 602, the first node 605 transmits, and the repeater 610 receives, a coordinated LBT trigger. In some aspects, action 602 includes the first node 605 transmitting, and the repeater 610 receiving, a control signal indicating an LBT trigger associated with the first node 605 and the repeater 610. In some aspects, the control signal includes at least one of a downlink control information (DCI), a radio resource control (RRC) message, and/or a media access control-control element (MAC-CE). In some aspects, the control signal may include a field carrying one or more bits indicating the LBT trigger. Transmitting the control signal may include receiving an indication of a channel access configuration. The control signal may include an indication of an entry index of a channel access table carried in DCI. Each row or entry of the channel access table may indicate a type of LBT to be performed. For example, the control signal may indicate the repeater 610 to perform an LBT CAT2, LBT CAT3, or LBT CAT4. Each row or entry of the table may also indicate a cyclic prefix extension index, and/or a channel access priority class (CAPC) associated with the indicated type of CCA.

Although FIG. 6 shows the control signal being transmitted from the first node 605, it will be understood that the coordinated LBT trigger may be transmitted by a different device, such as a control node. In some aspects, the control node may include a different BS.

In some aspects, the LBT trigger may indicate an LBT configuration for a coordinated LBT. In other aspects, the repeater 610 may receive an LBT timing configuration in a different LBT trigger. The LBT configuration may specify a defer period, a backoff counter value, and/or any other suitable LBT timing parameter. In one aspect, the LBT configuration may indicate the defer period as 16 μs+m*9 μs, where m is associated with the priority class (e.g., CAPC) of the scheduled UL communication. The random backoff period may involve an additional period of N*9 μs, where N is an integer. In some aspects, N may be a random integer determined or selected by the repeater 610. In another aspect, N may be a non-random value that is assignable based on an indication from the first node 605. For example, in some aspects, the repeater 610 may receive the indication of the entry or row of the channel access table. The entry or row may indicate the value N.

In other aspects, the LBT configuration may include or indicate other parameters of a coordinated LBT. For example, the LBT configuration may include or indicate a time offset for the beginning of the LBT as performed by the repeater 610, and the beginning of the LBT as performed by the first node 605. In some aspects, the time offset may indicate the repeater 610 and the first node 605 to start the LBT at the same time, or with a fixed time offset between them. The time offset parameter may indicate a number of μs, a number of slots, or a number of symbols, for example. In another aspect, the LBT configuration may include or indicate a maximum time limit for the coordinated LBT. For example, the maximum time limit may indicate a maximum time at which the repeater 610 and/or the first node 605 will cease or cancel the LBT if the LBT is not yet complete. In some aspects, the LBT configuration may indicate a type of the LBT (e.g., LBT CAT2, LBT CAT3, LBT CAT4). In another aspect, the LBT configuration may indicate a sensing beam configuration. For example, the LBT configuration may indicate the repeater 610 to sense in all or a portion of available beam directions, including front-haul beam directions toward the first node 605, and service beam directions toward other wireless communication devices (e.g., UEs) in the network. In some aspects, the sensing beam configuration may indicate one or more beam directions and/or TCI states for performing the LBT. In another aspect, the LBT configuration may indicate an initial counter value for an LBT CAT4. For example, the LBT configuration may indicate a non-random backoff counter value that can be used by the repeater 610 instead of a random backoff counter value. In some aspects, the LBT configuration may include or indicate a same counter value for both the repeater 610 and the first node 605 such that the duration of the LBTs performed by the repeater 610 and the first node 605 may be the same. In other aspects, the LBT configuration may indicate different counter values for the repeater 610 and the first node 605. In another aspect, the LBT configuration may include or indicate one or more parameters for an indication signal. For example, the LBT configuration may indicate a signal index, candidate resources for transmitting and/or receiving success signals or restart signals, and or any other suitable signal parameter. In one example, the LBT configuration may indicate that the indication signal spans 1 sensing slot, 2 sensing slots, 1 symbol, 2 symbols, 4 symbols, 7 symbols, or any other suitable time measurement. In another aspect, the LBT configuration indicates a first sensing slot for an indication signal transmission, and a different second sensing slot for an indication signal reception. The repeater 610 may perform the LBT based on the LBT configuration described above. The LBT configuration may include an LBT timing configuration.

In some aspects, the LBT configuration may include parameters for monitoring for indications or signals during the LBT and/or during additional channel sensing performed after the LBT (described further below). For example, the LBT configuration may indicate candidate indication signal occasions or resources that the first node 605 and the repeater 610 may use to transmit and/or monitor for success signals, restart indications, and/or any other suitable indication signals.

At action 604, the first node performs an LBT based on the LBT trigger. At action 606, the repeater 610 also performs an LBT based on the LBT trigger. In this regard, as both the first node 605 and the repeater 610 are performing LBTs based on the same trigger or control signal, the LBTs may be collectively referred to as a coordinated LBT. The LBTs may be LBT CAT2, LBT CAT3, or LBT CAT4. Performing the LBTs may include sensing a channel for one or more time periods based on an LBT configuration. The LBT configuration may indicate a duration of the channel sensing, and/or a duration of different time periods of the LBT. For example, performing the LBTs may include performing an LBT CAT2. The LBT CAT2 may have a fixed duration of 25 μs or 16 μs. The duration may be based on the subcarrier spacing (SCS) of the channel. In some aspects, performing the LBT includes performing an LBT CAT4. The LBT CAT 4 may include a fixed defer period followed by a random backoff period. The random backoff period may be based on a random counter value selected by the first node 605, as described above with respect to FIGS. 3 and 4.

At action 608, the first node 605 transmits, and the repeater 610 receives, a success signal. In some aspects, action 608 may include the first node 605 transmitting, to the repeater 610, a reference signal scrambled by the first node's ID. In some aspects, the success signal may include DCI transmitted over PDCCH, UCI transmitted over PUCCH, SCI transmitted over PSCCH, and/or any other suitable signal. The first node 605 may transmit the success signal to the repeater 610 based on the LBT passing. The first node 605 may transmit the success signal over a licensed band, or over an unlicensed band. For example, the first node 605 may transmit the success signal on the shared frequency band for which the COT is being acquired.

At action 611, the repeater 610 performs additional channel sensing after transmitting the success signal. In some aspects, the repeater 610 may initiate the additional channel sensing immediately after transmitting the success signal at action 616. Action 611 may include measuring signal power and/or signal energy (e.g., RSRP), and comparing the measured signal power to a threshold. In some aspects, if the repeater 610 detects busy signals or interference that exceeds a threshold during the period between transmitting the success signal and receiving a success signal from the first node 605. The first node 605 device may cancel the COT and transmit, to the first node 605, a restart indication or restart signal. The repeater 610 may transmit the restart indication after a latency period associated with processing and decoding sensing slot candidates to determine whether a success signal was received. Because the of the latency period, in some instances, the repeater 610 may transmit or receive a restart indication after initiating the COT. For example, the repeater 610 may sense or detect that the channel is busy immediately before the COT, and transmit the restart indication after the first node 605 has initiated the COT. Accordingly, the repeater may receive the restart indication during the COT, and cancel the COT after initiating.

At action 612, the repeater 610 transmits, and the first node 605 receives, a restart indication. The repeater 610 may transmit the restart indication based on the additional channel sensing performed at action 611. For example, the repeater 610 may transmit the restart indication based on signal measurements (e.g., RSRP) exceeding a threshold. In some aspects, the restart indication may include DCI transmitted over PDCCH, UCI transmitted over PUCCH, SCI transmitted over PSCCH, and/or any other suitable signal.

In some aspects, the first node 605 and the repeater 610 may monitor for the success signals while performing their respective LBT procedures. For example, the first node 605 and the repeater 610 may be configured with candidate success signal time resources (e.g., slots, symbols) during which a success signal may be communicated from the other node. Accordingly, if the first node 605 determines that the channel was busy during one of the candidate success signal time resources, and also determines that a success signal was received during the success signal time resource, the first node 605 may treat the sensed channel as idle during the candidate success signal time period.

At action 614, the repeater 610 restarts the LBT based on the channel sensing performed at action 611. In some aspects, action 614 may include restarting all or a portion of the LBT period. The LBT period may include a defer period and a random backoff period. In another aspect, action 614 may include restarting a portion of the LBT period, such as the random backoff period.

At action 616, the repeater 610 transmits, and the first node 605 receives, a second success signal. As explained above, action 616 may include the repeater 610 transmitting, to the first node 605, a reference signal scrambled by the first node's ID. In some aspects, the second success signal may include DCI transmitted over PDCCH, UCI transmitted over PUCCH, SCI transmitted over PSCCH, and/or any other suitable signal. The repeater 610 may transmit the second success signal to the first node 605 based on the restarted LBT passing. The repeater 610 may transmit the success signal over a licensed band, or over an unlicensed band. For example, the repeater 610 may transmit the success signal on the shared frequency band for which the COT is being acquired.

At action 618, the first node 605 transmits, and the repeater 610 receives, a success signal. As explained above, action 618 may include the first node 605 transmitting, to the repeater 610, a reference signal scrambled by the first node's ID. In some aspects, the success signal may include DCI transmitted over PDCCH, UCI transmitted over PUCCH, SCI transmitted over PSCCH, and/or any other suitable signal. The first node 605 may transmit the success signal to the repeater 610 based on the LBT performed at action 604 passing. The first node 605 may transmit the success signal over a licensed band, or over an unlicensed band. For example, the first node 605 may transmit the success signal on the shared frequency band for which the COT is being acquired.

At action 620, the first node 605 performs additional channel sensing in a gap period between transmitting the success signal at action 618 and initiating the COT. In some aspects, the first node 605 may initiate the additional channel sensing immediately after transmitting the success signal at action 616. In other aspects, the first node 605 may initiate the additional channel sensing after the first node 605 has both transmitted a success signal to the repeater 610, and received a success signal from the repeater 610. Action 620 may include measuring signal power and/or signal energy (e.g., RSRP), and comparing the measured signal power to a threshold. In some aspects, the first node 605 may perform the additional channel sensing using the same channel sensing parameters used to perform the LBT at action 604. For example, the first node 605 may perform the channel sensing based on a same ED threshold used to perform the LBT. In some aspects, if the first node 605 detects busy signals or interference that exceeds a threshold during any of the gap periods described above, the first node 605 device may cancel the COT and transmit, to the repeater 610, a restart indication or restart signal. The first node 605 may transmit the restart indication after a latency period associated with processing and decoding sensing slot candidates to determine whether a success signal was received. Because the of the latency period, in some instances, the first node 605 may transmit or receive a restart indication after initiating the COT. For example, the first node 605 may sense or detect that the channel is busy immediately before the COT, and transmit the restart indication after the repeater 610 has initiated the COT. Accordingly, the repeater may receive the restart indication during the COT, and cancel the COT after initiating.

At action 622, the repeater 610 performs additional channel sensing in a gap period between receiving the success signal at action 618 and the beginning of the COT. In some aspects, the repeater 610 may initiate the additional channel sensing immediately after transmitting the success signal at action 618. In other aspects, the repeater 610 may initiate the additional channel sensing after the repeater 610 has both transmitted a success signal to the first node 605, and received a success signal from the first node 605. Action 622 may include measuring signal power and/or signal energy (e.g., RSRP), and comparing the measured signal power to a threshold. In some aspects, if the repeater 610 detects busy signals or interference that exceeds a threshold during any of the gap periods described above, the repeater 610 device may cancel the COT and transmit, to the first node 605, a restart indication or restart signal. The repeater 610 may transmit the restart indication after a latency period associated with processing and decoding sensing slot candidates to determine whether a success signal was received. Because the of the latency period, in some instances, the repeater 610 may transmit or receive a restart indication after initiating the COT. For example, the repeater 610 may sense or detect that the channel is busy immediately before the COT, and transmit the restart indication after the first node 605 has initiated the COT. Accordingly, the repeater 610 may receive the restart indication during the COT, and cancel the COT after initiating.

At action 624, the first node 605 initiates the COT based on the success signal received at action 616 and the success signal transmitted at action 618. In some aspects, initiating the COT may include beginning communications in the COT. For example, the first node 605 may transmit, to the repeater 610, a control signal (e.g., DCI) indicating that the COT has been initiated. The control signal may schedule DL and/or UL resources in the COT, for example.

At action 626, the repeater 610 initiates the COT based on the success signal transmitted at action 616 and the success signal received at action 618. In some aspects, initiating the COT may include beginning communications in the COT. For example, the repeater 610 may amplify and forward, to the second node 615, a control signal (e.g., DCI) indicating that the COT has been initiated. The control signal may schedule DL and/or UL resources in the COT, for example.

At action 628, the first node 605 transmits, to the repeater 610, a communication. In some aspects, the communication is intended for the second node 615. The second node 615 may include a BS or a UE, for example. The communication may include reference signals, control signals (e.g., DCI), and/or DL data, for example. For example, the communication may include DCI and/or DL data scrambled with the second node's 615 ID.

At action 630, the repeater 610 transmits, to the second node 615, the communication received at action 628. In some aspects, action 630 includes an amplify-and-forward operation. The transmission of the communication may be performed within the COT initiated by the first node 605. The communication may indicate scheduled resources for DL and/or UL communications. For example, the communication may include DCI indicating the second node 615 to share the COT. At action 602, the BS 105 transmits, and the UE 115 receives, a DCI indicating that a BS COT has been acquired or initiated by the BS 105. In some aspects, action 602 includes the UE 115 receiving a DCI 2_0 indicating a time resource associated with the BS COT.

Figure 7:
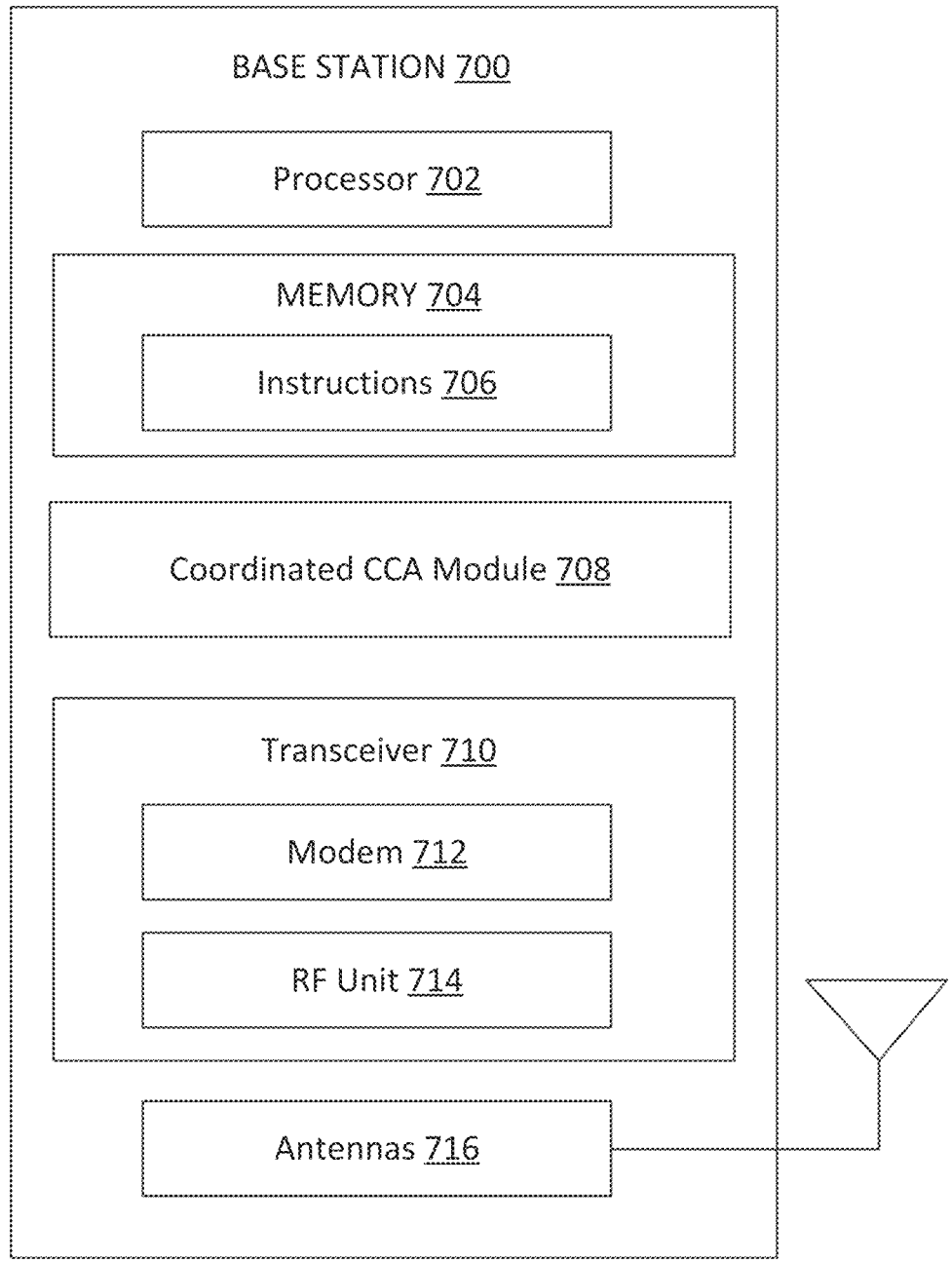
FIG. 7 illustrates a block diagram of a wireless communication device according to some aspects of the present disclosure.

FIG. 7 is a block diagram of an exemplary wireless communication device 700 according to some aspects of the present disclosure. The wireless communication device 700 may be a BS 105 as discussed in FIGS. 1-6. In some aspects, the wireless communication device 700 may include a BS. In other aspects, the wireless communication may include a UE. The wireless communication device 700 may include any wireless node or entity, such as the devices of the network 100 shown in FIG. 1. As shown, in FIG. 7, the wireless communication device 700 may include a processor 702, a memory 704, a Coordinated CCA module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein.

The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-6. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Coordinated CCA module 708 may be implemented via hardware, software, or combinations thereof. For example, the Coordinated CCA module 708 may be implemented as a processor, circuit, and/or instructions 706 stored in the memory 704 and executed by the processor 702. In some examples, the Coordinated CCA module 708 can be integrated within the modem subsystem 712. For example, the Coordinated CCA module 708 can be implemented by a combination of software components (e.g., executed by a DSP or a general processor) and hardware components (e.g., logic gates and circuitry) within the modem subsystem 712. The Coordinated CCA module 708 may communicate with one or more components of wireless communication device 700 to implement various aspects of the present disclosure, for example, aspects of FIGS. 1-6.

For instance, the Coordinated CCA module 708 may be configured to transmit a control signal indicating a clear channel assessment (CCA) trigger associated with the first wireless communication device and a second wireless communication device. In some aspects, the control signal includes at least one of a downlink control information (DCI), a radio resource control (RRC) message, and/or a media access control-control element (MAC-CE). In some aspects, the control signal may include a field carrying one or more bits indicating the CCA trigger. Transmitting the control signal may include transmitting an indication of a channel access configuration. The control signal may include an indication of an entry index of a channel access table carried in DCI. In some aspects, each row or entry of the channel access table indicates a type of CCA to be performed. For example, the control signal may indicate the first wireless communication device to perform an LBT CAT2, LBT CAT3, or LBT CAT4. Each row or entry of the table may also indicate a cyclic prefix extension index, and/or a channel access priority class (CAPC) associated with the indicated type of CCA. In some aspects, the CCA trigger may be a trigger for performing a coordinated listen-before-talk (LBT) procedure.

In some aspects, the Coordinated CCA module 708 may be configured to communicate with other wireless communication devices (e.g., user equipments (UEs), BSs) via the second wireless communication device (e.g., smart repeater). In other words, the second wireless communication device may include a repeater or relay node configured to forward or relay communications between the wireless communication device 700 and receiving wireless communication devices in the network (e.g., UEs).

In some aspects, the Coordinated CCA module 708 may be configured to perform, based on the CCA trigger indicated in the control signal, a CCA. In some aspects, the Coordinated CCA module 708 may be configured to perform an LBT. The LBT may be an LBT CAT2, LBT CAT3, or LBT CAT4. Performing the CCA may include sensing a channel for one or more time periods based on a CCA configuration. The CCA configuration may indicate a duration of the channel sensing, and/or a duration of different time periods of the CCA. For example, performing the CCA may include performing an LBT CAT2. The LBT CAT2 may have a fixed duration of 25 µs or 16 µs. The duration may be based on the subcarrier spacing (SCS) of the sensed channel. In some aspects, performing the CCA includes performing an LBT CAT4. The LBT CAT4 may include a fixed defer period followed by a random backoff period. The random backoff period may be based on a random counter value selected by the wireless communication device 700, as described above with respect to FIGS. 3 and 4.

In some aspects, the Coordinated CCA module 708 may be configured to receive, from the second wireless communication device based on the CCA, a first CCA success signal. In some aspects, the Coordinated CCA module 708 may be configured to receive, from the second wireless communication device, a reference signal scrambled by the second wireless communication device's ID. In some aspects, the first success signal may include DCI transmitted over PDCCH, UCI transmitted over PUCCH, SCI transmitted over PSCCH, and/or any other suitable control signal. The Coordinated CCA module 708 may be configured to receive the first success signal from the second wireless communication device based on the second wireless communication device determining that the CCA passed. The Coordinated CCA module 708 may be configured to receive the first success signal over a licensed band, or over an unlicensed band. For example, the Coordinated CCA module 708 may be configured to receive the first success signal on the shared frequency band for which the COT is being acquired.

In some aspects, the Coordinated CCA module 708 may be configured to transmit, to the second wireless communication device, a second success signal. As similarly explained above, the Coordinated CCA module 708 may be configured to transmit, to the second wireless communication device, a reference signal scrambled by the first wireless communication device's ID. In some aspects, the second success signal may include DCI received over PDCCH, UCI received over PUCCH, SCI received over PSCCH, and/or any other suitable control signal. The Coordinated CCA module 708 may be configured transmit the second success signal to the second wireless communication device based on the first wireless communication device determining that the CCA performed by the second wireless communication device results in a pass. For example, performing the CCA may include performing an LBT, and the Coordinated CCA module 708 may be configured to transmit the second success signal if the LBT results in a pass (e.g., measured signal energy/power falls below ED threshold). In some aspects, the Coordinated CCA module 708 may be configured to initiate, based on the first CCA success signal and the second CCA success signal, a channel occupancy time (COT). The COT may be associated with the second wireless communication device.

As shown, the transceiver 710 may include the modem subsystem 712 and the RF unit 714. The transceiver 710 can be configured to communicate bi-directionally with other devices, such as the UEs 115 and/or wireless communication device 700 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC configurations, PDSCH data, PDCCH DCI, etc.) from the modem subsystem 712 (on outbound transmissions) or of transmissions originating from another source such as a UE 115 and/or the repeater 800. The RF unit 714 may be further configured to perform analog beamforming in conjunction with the digital beamforming. Although shown as integrated together in transceiver 710, the modem subsystem 712 and/or the RF unit 714 may be separate devices. For example, the modem subsystem 712 and the RF unit 714 may be coupled together at the wireless communication device 700 to enable the wireless communication device 700 to communicate with other devices.

The RF unit 714 may provide the modulated and/or processed data, e.g., data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., PUSCH data, PUCCH UCI, etc.) to the Coordinated CCA module 708 for processing. The antennas 716 may include multiple antennas of similar or different designs in order to sustain multiple transmission links.

In an aspect, the wireless communication device 700 can include multiple transceivers 710 implementing different RATs (e.g., NR and LTE). In an aspect, the wireless communication device 700 can include a single transceiver 710 implementing multiple RATs (e.g., NR and LTE). In an aspect, the transceiver 710 can include various components, where different combinations of components can implement different RATs.

Further, in some aspects, the processor 702 is configured to communicate with various components of the wireless communication device 700 to indicate one or more aspects of a coordinated CCA configuration. The transceiver 710 is coupled to the processor 702 and, and may be configured to transmit an indication of a CCA configuration, and a request to perform a CCA associated with a second CCA configuration.

Figure 8:
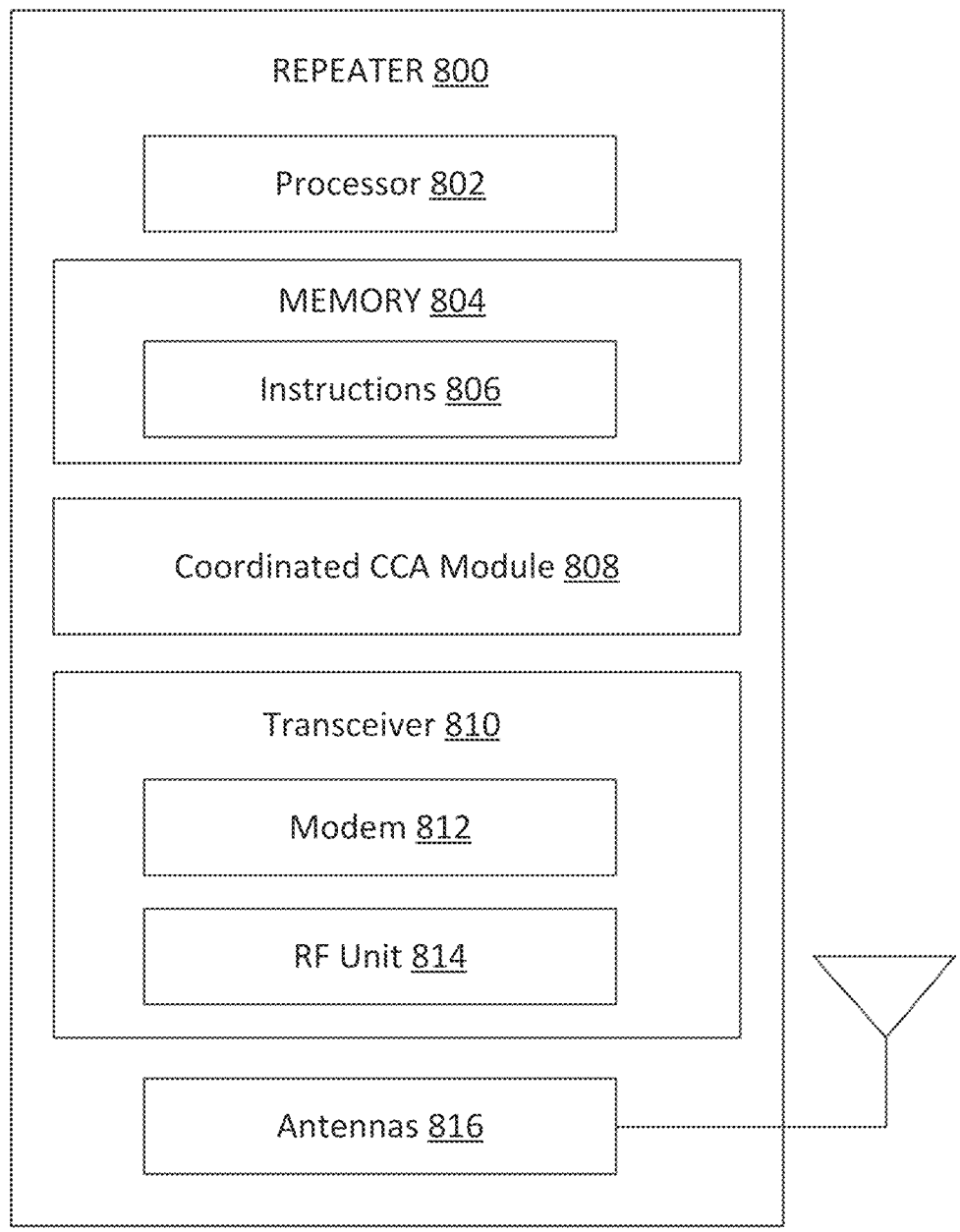
FIG. 8 illustrates a block diagram of a repeater according to some aspects of the present disclosure.

FIG. 8 is a block diagram of an exemplary repeater 800 according to some aspects of the present disclosure. The repeater 800 may be a smart repeater configured for amplify-and-forward operation, as explained above. As shown, the repeater 800 may include a processor 802, a memory 804, a Coordinated CCA module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to a UE 115 or an anchor in connection with aspects of the present disclosure, for example, aspects of FIGS. 1-6. Instructions 806 may also be referred to as code. The code may be interpreted broadly to include any type of computer-readable statement(s) as discussed above.

The Coordinated CCA module 808 may be implemented via hardware, software, or combinations thereof. For example, the Coordinated CCA module 808 may be implemented as a processor, circuit, and/or instructions 806 stored in the memory 804 and executed by the processor 802. In some aspects, the Coordinated CCA module 808 can be integrated within the modem subsystem 812. For example, the Coordinated CCA module 808 can be implemented by a combination of software components (e.g., executed by a DSP or a general processor) and hardware components (e.g., logic gates and circuitry) within the modem subsystem 812. The Coordinated CCA module 808 may communicate with one or more components of repeater 800 to implement various aspects of the present disclosure, for example, aspects of FIGS. 1-6.

For instance, the Coordinated CCA module 808 is configured to receive a control signal indicating a clear channel assessment (CCA) trigger associated with the first wireless communication device and a second wireless communication device. In some aspects, the control signal includes at least one of a downlink control information (DCI), a radio resource control (RRC) message, and/or a media access control-control element (MAC-CE). In some aspects, the control signal may include a field carrying one or more bits indicating the CCA trigger. The Coordinated CCA module 808 may be configured to receive an indication of a channel access configuration. The control signal may include an indication of an entry index of a channel access table carried in DCI, where each row or entry of the channel access table indicates a type of CCA to be performed. For example, the control signal may indicate the first wireless communication device to perform an LBT CAT2, LBT CAT3, or LBT CAT4. Each row or entry of the table may also indicate a cyclic prefix extension index, and/or a channel access priority class (CAPC) associated with the indicated type of CCA. In some aspects, the CCA trigger is a trigger for performing a coordinated LBT procedure.

In some aspects, the Coordinated CCA module 808 is configured to receive the control signal from a second wireless communication device. The second wireless communication device may be a base station (BS), such as the wireless communication device 700. The second wireless communication device may be an initiating transmission node, and the CCA may be initiated or associated with the second wireless communication device. The second wireless communication device may be configured to communicate with other wireless communication devices (e.g., user equipments (UEs), BSs) via the first wireless communication device (e.g., smart repeater). In other aspects, the Coordinated CCA module 808 is configured to receive the control signal from a different wireless communication device, such as a third wireless communication device. In some aspects, the Coordinated CCA module 808 is configured to receive the control signal from a control node.

In some aspects, the Coordinated CCA module 808 is configured to perform, based on the CCA trigger indicated in the control signal, a CCA. In some aspects, the Coordinated CCA module 808 is configured to perform an LBT. The LBT may be an LBT CAT2, LBT CAT3, or LBT CAT4. Performing the CCA may include sensing a channel for one or more time periods based on a CCA configuration. The CCA configuration may indicate a duration of the channel sensing, and/or a duration of different time periods of the CCA. For example, performing the CCA may include performing an LBT CAT2. LBT CAT2 may have a fixed duration of 25 μs or 16 μs. The duration may be based on the subcarrier spacing (SCS) of the channel. In some aspects, performing the CCA includes performing an LBT CAT4. LBT CAT4 may include a fixed defer period followed by a random backoff period. The random backoff period may be based on a random counter value selected by the first wireless communication device, as described above with respect to FIGS. 3 and 4.

The Coordinated CCA module 808 may be configured to transmit, to the second wireless communication device based on the CCA, a first CCA success signal. In some aspects, the Coordinated CCA module 808 is configured to transmit, to the second wireless communication device, a reference signal scrambled by the repeater's device ID. In some aspects, the first success signal may include DCI transmitted over PDCCH, UCI transmitted over PUCCH, SCI transmitted over PSCCH, and/or any other suitable control signal. The Coordinated CCA module 808 may be configured to transmit the first success signal to the second wireless communication device based on the CCA passing. For example, performing the CCA may include performing an LBT, and the Coordinated CCA module 808 may transmit the first success signal if the LBT results in a pass (e.g., measured signal energy/power falls below ED threshold). The Coordinated CCA module 808 may be configured to transmit the success signal over a licensed band, or over an unlicensed band. For example, the Coordinated CCA module 808 may transmit the success signal on the shared frequency band for which the COT is being acquired.

In some aspects, the Coordinated CCA module 808 is configured to receive, from the second wireless communication device, a second success signal. As similarly explained above, the Coordinated CCA module 808 may be configured to receive, from the second wireless communication device, a reference signal scrambled by the second wireless communication device's ID. In some aspects, the second success signal may include DCI received over PDCCH, UCI received over PUCCH, SCI received over PSCCH, and/or any other suitable control signal. The coordinated CCA module 808 may receive the second success signal from the second wireless communication device based on the second wireless communication device determining that the CCA performed by the second wireless communication device results in a pass. For example, performing the CCA may include performing an LBT, and the second wireless communication device may be configured to transmit the second success signal if the LBT results in a pass (e.g., measured signal energy/power falls below ED threshold). In some aspects, the Coordinated CCA module 808 is configured to initiate, based on the first CCA success signal and the second CCA success signal, a channel occupancy time (COT). The COT may be associated with the second wireless communication device.

As shown, the transceiver 810 may include the modem subsystem 812 and the RF unit 814. The transceiver 810 can be configured to communicate bi-directionally with other devices, such as the BSs 105 and 1300. The modem subsystem 812 may be configured to modulate and/or encode the data from the memory 804 and/or the Coordinated CCA module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUSCH data, PUCCH UCI, sidelink transmissions, etc.) from the modem subsystem 812 (on outbound transmissions) or of transmissions originating from another source such as a UE 115, a BS 105, or an anchor. The RF unit 814 may be further configured to perform analog beamforming in conjunction with the digital beamforming. Although shown as integrated together in transceiver 810, the modem subsystem 812 and the RF unit 814 may be separate devices. For example, the modem subsystem 812 and the RF unit 814 may be coupled together at the repeater 800 to enable the repeater 800 to communicate with other devices.

The RF unit 814 may provide the modulated and/or processed data, e.g., data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RRC configurations, PDSCH data, PDCCH DCI, etc.) to the Coordinated CCA module 808 for processing. The antennas 816 may include multiple antennas of similar or different designs in order to sustain multiple transmission links.

In an aspect, the repeater 800 can include multiple transceivers 810 implementing different RATs (e.g., NR and LTE). In an aspect, the repeater 800 can include a single transceiver 810 implementing multiple RATs (e.g., NR and LTE). In an aspect, the transceiver 810 can include various components, where different combinations of components can implement different RATs.

Further, in some aspects, the processor 802 is configured to communicate with various components of the repeater 800 to perform a clear channel assessment (CCA) based on one or more CCA configurations, as explained above. The transceiver 810 is coupled to the processor 802 and configured to transmit, after the CCA based on a second CCA configuration, a communication.

Figure 9:
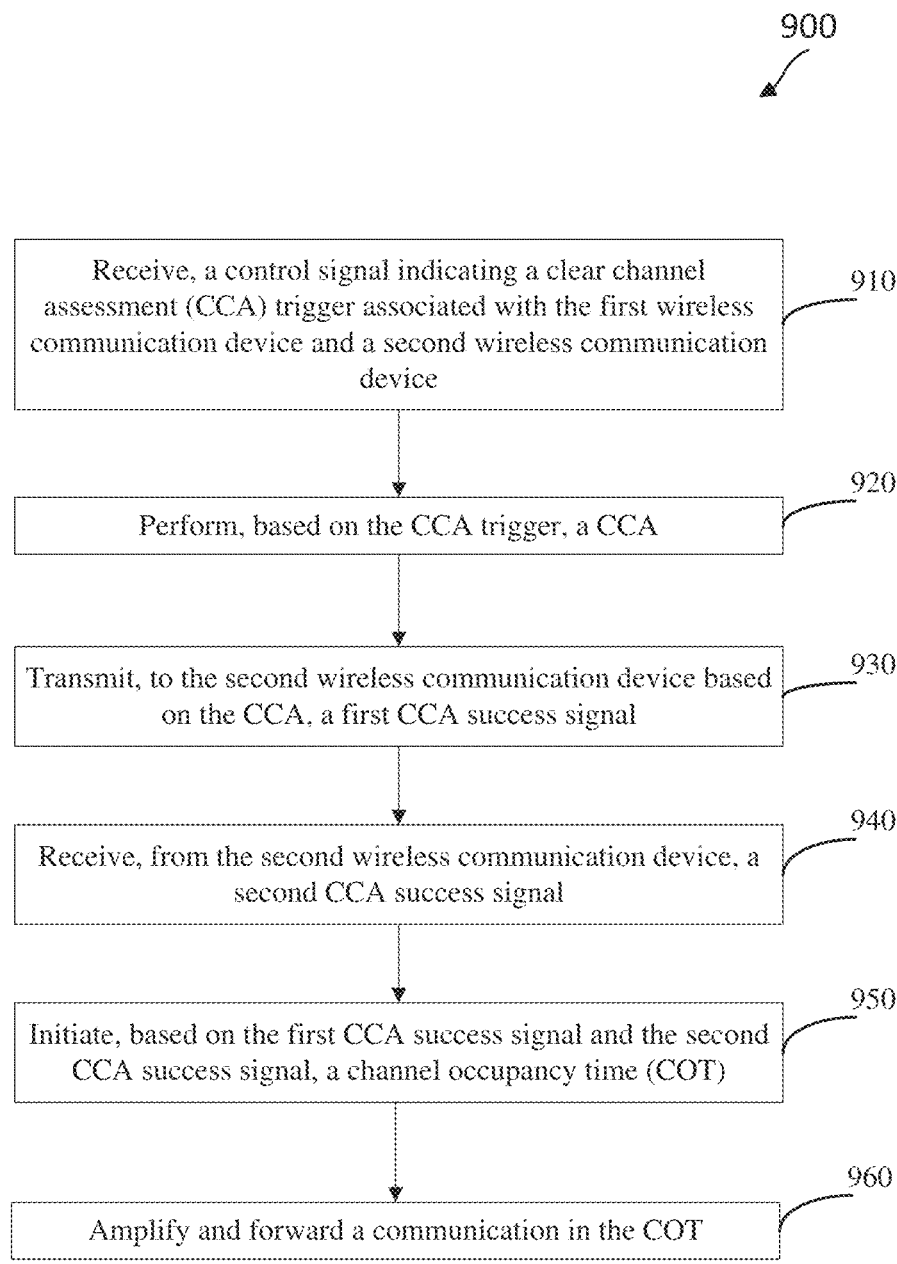
FIG. 9 is a flow diagram of a wireless communication method according to some aspects of the present disclosure.

FIG. 9 is a flow diagram illustrating a wireless communication method 900 according to some aspects of the present disclosure. Aspects of the method 900 can be executed by a computing device (e.g., a processor, processing circuit, and/or other suitable component) of a wireless communication device or other suitable means for performing the blocks. For example, a wireless node, such as a wireless repeater, may utilize one or more components, such as the processor 802, the memory 804, the Coordinated CCA module 808, the transceiver 810, the modem 812, the RF unit 814, and the one or more antennas 816, to execute the blocks of method 900. The wireless repeater or relay device may be configured to perform amplify-and-forward operations between two wireless nodes, such as between a BS and a UE. Aspects of the method 900 allow for a coordinated approach to CCAs such that a smart repeater and a wireless communication device initiated a channel occupancy time (COT) can perform an LBT in time periods that at least partially overlap. Accordingly, the COT-initiating wireless communication device and the repeater may initiate the COT based on the condition of both nodes transmitting and receiving success signals based on the coordinated CCA. The method 900 may employ similar mechanisms as described in FIGS. 1-6. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, the first wireless communication device receives a control signal indicating a clear channel assessment (CCA) trigger associated with the first wireless communication device and a second wireless communication device. In some aspects, the control signal includes at least one of a downlink control information (DCI), a radio resource control (RRC) message, and/or a media access control-control element (MAC-CE). In some aspects, the control signal may include a field carrying one or more bits indicating the CCA trigger. Receiving the control signal may include receiving an indication of a channel access configuration. The control signal may include an indication of an entry index of a channel access table carried in DCI, where each row or entry of the channel access table indicates a type of CCA to be performed. For example, the control signal may indicate the first wireless communication device to perform an LBT CAT2, LBT CAT3, or LBT CAT4. Each row or entry of the table may also indicate a cyclic prefix extension index, and/or a channel access priority class (CAPC) associated with the indicated type of CCA. In some aspects, the CCA trigger is a trigger for performing a coordinated LBT procedure.

In some aspects, block 910 may include receiving the control signal from the second wireless communication device. The second wireless communication device may be a base station (BS). The second wireless communication device may be an initiating transmission node, and the CCA may be initiated or associated with the second wireless communication device. The second wireless communication device may be configured to communicate with other wireless communication devices (e.g., user equipments (UEs), BSs) via the first wireless communication device (e.g., smart repeater). In other words, the first wireless communication device may include a repeater or relay node configured to forward or relay communications between the second wireless communication device and receiving wireless communication devices in the network (e.g., UEs). In other aspects, block 910 may include receiving the control signal from a different wireless communication device, such as a third wireless communication device. In some aspects, block 910 includes receiving the control signal from a control node. The control node may include a BS and/or other node configured to trigger the coordinated CCA for the first wireless communication device and the second wireless communication device. The repeater 800 may use one or more components, such as the processor 802, memory 804, coordinated CCA module 808, transceiver 810, and/or the antennas 816, to perform the actions of block 910.

At block 920, the first wireless communication device performs, based on the CCA trigger indicated in the control signal, a CCA. In some aspects, block 920 includes performing an LBT. The LBT may be an LBT CAT2, LBT CAT3, or LBT CAT4. Performing the CCA may include sensing a channel for one or more time periods based on a CCA configuration. The CCA configuration may indicate a duration of the channel sensing, and/or a duration of different time periods of the CCA. For example, performing the CCA may include performing an LBT CAT2. LBT CAT2 may have a fixed duration of 25 μs or 16 μs. The duration may be based on the subcarrier spacing (SCS) of the channel. In some aspects, performing the CCA includes performing an LBT CAT4. LBT CAT4 may include a fixed defer period followed by a random backoff period. The random backoff period may be based on a random counter value selected by the first wireless communication device, as described above with respect to FIGS. 3 and 4. The repeater 800 may use one or more components, such as the processor 802, memory 804, coordinated CCA module 808, transceiver 810, and/or the antennas 816, to perform the actions of block 920.

At block 930, the first wireless communication device transmits, to the second wireless communication device based on the CCA, a first CCA success signal. In some aspects, block 930 may include the first wireless communication device transmitting, to the second wireless communication device, a reference signal scrambled by the first wireless communication device's ID. In some aspects, the first success signal may include DCI transmitted over PDCCH, UCI transmitted over PUCCH, SCI transmitted over PSCCH, and/or any other suitable control signal. The first wireless communication device may transmit the first success signal to the second wireless communication device based on the CCA passing. For example, performing the CCA may include performing an LBT, and the first wireless communication device may be configured to transmit the first success signal if the LBT results in a pass (e.g., measured signal energy/power falls below ED threshold). The first wireless communication device may transmit the success signal over a licensed band, or over an unlicensed band. For example, the first wireless communication device may transmit the success signal on the shared frequency band for which the COT is being acquired. The repeater 800 may use one or more components, such as the processor 802, memory 804, coordinated CCA module 808, transceiver 810, and/or the antennas 816, to perform the actions of block 930.

At block 940, the first wireless communication device receives, from the second wireless communication device, a second success signal. As similarly explained above, block 940 may include the first wireless communication device receiving, from the second wireless communication device, a reference signal scrambled by the second wireless communication device's ID. In some aspects, the second success signal may include DCI received over PDCCH, UCI received over PUCCH, SCI received over PSCCH, and/or any other suitable control signal. The first wireless communication device may receive the second success signal from the second wireless communication device based on the second wireless communication device determining that the CCA performed by the second wireless communication device results in a pass. For example, performing the CCA may include performing an LBT, and the second wireless communication device may be configured to transmit the second success signal if the LBT results in a pass (e.g., measured signal energy/power falls below ED threshold). It will be understood that blocks 930 and 940 may not be performed in the order of transmitting first and receiving second. In this regard, in some aspects, the first wireless communication device may receive the second success signal before transmitting the first success signal. In other aspects, the first wireless communication device may transmit the first success signal before receiving the second success signal. The repeater 800 may use one or more components, such as the processor 802, memory 804, coordinated CCA module 808, transceiver 810, and/or the antennas 816, to perform the actions of block 940.

At block 950, the first wireless communication device initiates, based on the first CCA success signal and the second CCA success signal, a channel occupancy time (COT). The COT may be associated with the second wireless communication device. For example, the second wireless communication device may be a BS, and the COT may be a BS-initiated COT. The repeater 800 may use one or more components, such as the processor 802, memory 804, coordinated CCA module 808, transceiver 810, and/or the antennas 816, to perform the actions of block 950.

At block 960, the first wireless communication device amplifies and forwards a communication in the COT. In some aspects, amplifying and forwarding the communication may include receiving the communication from the second wireless communication device, and amplifying and forwarding the received communication to a receiving wireless communication device (e.g., a UE). In some aspects, amplifying and forwarding the communication may include receiving the communication from a transmitting wireless communication device (e.g., a UE) different from the second wireless communication device, and amplifying and forwarding the received communication to the second wireless communication device. The repeater 800 may use one or more components, such as the processor 802, memory 804, coordinated CCA module 808, transceiver 810, and/or the antennas 816, to perform the actions of block 960.

In some aspects, the control signal may indicate a CCA configuration for a coordinated CCA. In other aspects, the first wireless communication device may receive a CCA timing configuration in a different control signal. The CCA configuration may specify a defer period, a backoff counter value, and/or any other suitable CCA timing parameter. In one aspect, the CCA configuration may indicate the defer period as 16 μs+m*9 μs, where m is associated with the priority class (e.g., CAPC) of the scheduled UL communication. The random backoff period may involve an additional period of N*9 μs, where N is an integer. In some aspects, N may be a random integer determined or selected by the first wireless communication device. In another aspect, N may be a non-random value that is assignable based on an indication from the BS. For example, in some aspects, the first wireless communication device may receive the indication of the entry or row of the channel access table. In some aspects, the entry or row indicates the value N.

In other aspects, the CCA configuration may include or indicate other parameters of a coordinated CCA. For example, the CCA configuration may include or indicate a time offset for the beginning of the CCA as performed by the first wireless communication device, and the beginning of the CCA as performed by the second wireless communication device. In some aspects, the time offset may indicate the first wireless communication device and the second wireless communication device to start the CCA at the same time, or with a fixed time offset between them. The time offset parameter may indicate a number of μs, a number of slots, or a number of symbols, for example. In another aspect, the CCA configuration may include or indicate a maximum time limit for the coordinated CCA. For example, the maximum time limit may indicate a maximum time at which the first wireless communication device and/or the second wireless communication device will cease or cancel the CCA if the CCA is not yet complete. In some aspects, the CCA configuration may indicate a type of the CCA (e.g., LBT CAT2, LBT CAT3, LBT CAT4). In another aspect, the CCA configuration may indicate a sensing beam configuration. For example, the CCA configuration may indicate the first wireless communication device to sense in all or a portion of available beam directions, including front-haul beam directions toward the second wireless communication device, and service beam directions toward other wireless communication devices (e.g., UEs) in the network. In some aspects, the sensing beam configuration may indicate one or more beam directions and/or TCI states for performing the CCA. In another aspect, the CCA configuration may indicate an initial counter value for an LBT CAT4. For example, the CCA configuration may indicate a non-random backoff counter value that can be used by the first wireless communication device instead of a random backoff counter value. In some aspects, the CCA configuration may include or indicate a same counter value for both the first wireless communication device and the second wireless communication device such that the duration of the CCAs performed by the first wireless communication device and the second wireless communication device may be the same. In other aspects, the CCA configuration may indicate different counter values for the first wireless communication device and the second wireless communication device. In another aspect, the CCA configuration may include or indicate one or more parameters for an indication signal. For example, the CCA configuration may indicate a signal index, candidate resources for transmitting and/or receiving success signals or restart signals, and or any other suitable signal parameter. In one example, the CCA configuration may indicate that the indication signal spans 1 sensing slot, 2 sensing slots, 1 symbol, 2 symbols, 4 symbols, 7 symbols, or any other suitable time measurement. In another aspect, the CCA configuration indicates a first sensing slot for an indication signal transmission, and a different second sensing slot for an indication signal reception. The first wireless communication device may perform the CCA based on the CCA configuration described above. In some aspects the CCA configuration may include a CCA timing configuration.

In one aspect, the control signal indicating the CCA trigger may cause the first wireless communication device to perform a plurality of CCAs. For example, the trigger may indicate the first wireless communication device to perform one coordinated LBT with the second wireless communication device. In another aspect, the control signal may include a trigger to perform a plurality of coordinated LBTs. Each successive LBT may begin with a specified offset after completion of a COT. The specified offset may be indicated in the CCA configuration. In another aspect, the first wireless communication may receive the control signal in a COT in an unlicensed band. In some aspects, the COT in which the control signal is received from be a COT initiated based on a coordinated CCA, as described above. In another aspect, the first wireless communication device may receive the control message over a licensed band. For example, the first wireless communication device may be configured to communicate in multiple frequency bands, including licensed and unlicensed bands. The first wireless communication device may be configured to monitor for the control signal on a first licensed band, and to perform the CCA on a different unlicensed band.

As explained above, in some instances, the first wireless communication device may receive, or transmit, a restart signal based on the coordinated CCA. The first wireless communication device may restart after transmitting the restart signal. In another aspect, the first wireless communication device may cancel a previously received success signal from the second wireless communication device based on receiving a restart signal. If the first wireless communication device restarts the CCA, the first wireless communication device may transmit and/or receive a success signal following the restarted CCA. Accordingly, the first wireless communication device may restart the CCA without receiving a control signal as in block 910. In some aspects, if the first wireless communication device detects signal energy rising above the threshold during the CCA, the first wireless communication device may determine whether a success signal was received from the second wireless communication device during the CCA, and/or whether the detected signal energy is associated with the received success signal. For example, the CCA configuration may indicate a candidate success signal sensing slot within the CCA period. Accordingly, the first wireless communication device may treat the candidate sensing slot as idle for the purposes of the CCA if a success signal was received in the candidate sensing slot after a detection latency.

In some aspects, the first wireless communication device may perform additional channel sensing during a first gap period between transmitting the first success signal, and receiving the second success signal. For example, the first wireless communication device may be configured to continue sensing the shared radio frequency band during the first gap period and comparing the sensed energy to a threshold. In another aspect, the first wireless communication device may perform additional channel sensing during a second gap period between the last-communicated success signal (received or transmitted) and the beginning of the COT. For example, the first wireless communication device may be configured to continue sensing the shared radio frequency band during the second gap period and comparing the sensed energy to a threshold. In another aspect, the first wireless communication device is configured to perform additional channel sensing during a gap period that extends between transmitting the success signal and the beginning of the COT. The first wireless communication may continue to regard candidate sensing slots as idle if a success signal is received in the candidate sensing slots, as explained above.

In some aspects, if the first wireless communication device detects busy signals or interference that exceeds a threshold during any of the gap periods described above, the first wireless communication device may cancel the COT and transmit, to the second wireless communication device, a restart indication or restart signal. The first wireless communication device may transmit the restart indication after a latency period associated with processing and decoding sensing slot candidates to determine whether a success signal was received. Because the of the latency period, in some instances, the first wireless communication device may transmit or receive a restart indication after initiating the COT. For example, the first wireless communication device may sense or detect that the channel is busy immediately before the COT, and transmit the restart indication after the second wireless communication device has initiated the COT. Accordingly, the second wireless communication device may receive the restart indication during the COT, and cancel the COT after initiating.

Figure 10:
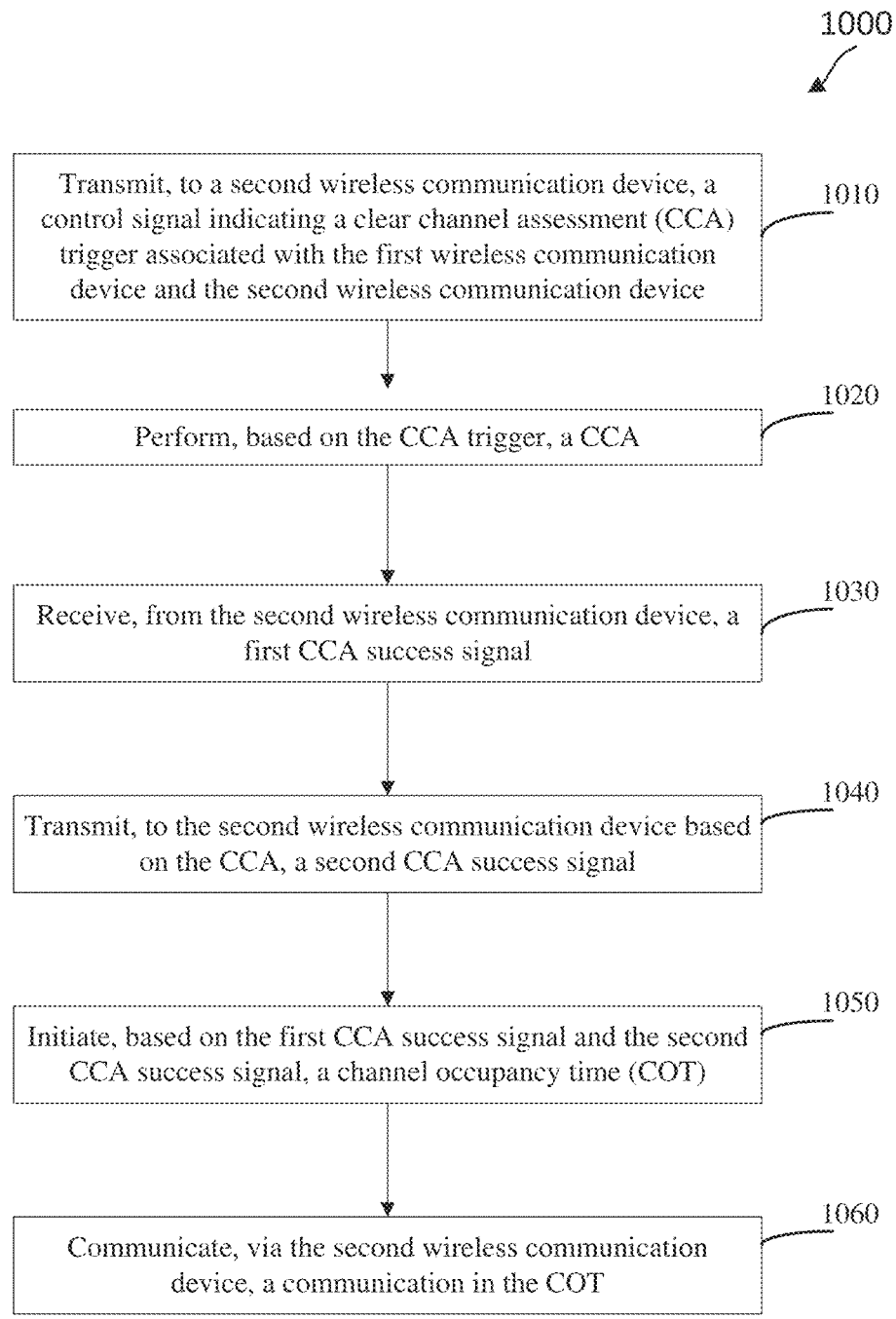
FIG. 10 is a flow diagram of a wireless communication method according to some aspects of the present disclosure.

FIG. 10 is a flow diagram illustrating a wireless communication method 1000 according to some aspects of the present disclosure. Aspects of the method 1000 can be executed by a wireless communication device, such as the wireless communication device 700. For example, the wireless communication device may include a BS, such as one of the BS 105 of the network 100, or a UE, such as one of the UEs 115 of the network 100 wireless communication device 700. In some aspects, a BS may employ the method 1000 for BS-to-UE communications. In other aspects, a UE may employ the method 1000 for UE-to-BS communications. In other aspects, two or more UEs may employ the method 1000 for UE-to-UE sidelink communications. In still other aspects, two or more BSs may employ the method 1000 for BS-to-BS sidelink communications. Accordingly, although aspects of the method 1000 may be described as involving communications between a BS, a repeater, and a UE, it will be understood that these examples are not limiting and that other communication scenarios are also contemplated by the present disclosure. The wireless communication device 700 for example, may utilize one or more components, such as the processor 702, the memory 704, the Coordinated CCA module 708, the transceiver 710, the modem 712, the RF unit 714, and the one or more antennas 716, to execute the blocks of method 1000. The method 1000 may employ similar mechanisms as described in FIGS. 1-6. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the first wireless communication device transmits a control signal indicating a clear channel assessment (CCA) trigger associated with the first wireless communication device and a second wireless communication device. In some aspects, the control signal includes at least one of a downlink control information (DCI), a radio resource control (RRC) message, and/or a media access control-control element (MAC-CE). In some aspects, the control signal may include a field carrying one or more bits indicating the CCA trigger. Transmitting the control signal may include transmitting an indication of a channel access configuration. The control signal may include an indication of an entry index of a channel access table carried in DCI. In some aspects, each row or entry of the channel access table indicates a type of CCA to be performed. For example, the control signal may indicate the first wireless communication device to perform an LBT CAT2, LBT CAT3, or LBT CAT4. Each row or entry of the table may also indicate a cyclic prefix extension index, and/or a channel access priority class (CAPC) associated with the indicated type of CCA. In some aspects, the CCA trigger is a trigger for performing a coordinated listen-before-talk (LBT) procedure.

In some aspects, the first wireless communication device may be a base station (BS). The first wireless communication device may be an initiating transmission node, and the CCA may be initiated or associated with the first wireless communication device. The first wireless communication device may be configured to communicate with other wireless communication devices (e.g., user equipments (UEs), BSs) via the second wireless communication device (e.g., smart repeater). In other words, the second wireless communication device may include a repeater or relay node configured to forward or relay communications between the first wireless communication device and receiving wireless communication devices in the network (e.g., UEs). In other aspects, block 1010 may include transmitting the control signal from a different wireless communication device, such as a third wireless communication device. The wireless communication device 700 may use one or more components, such as the processor 702, memory 704, coordinated CCA module 708, transceiver 710, and/or the antennas 716, to perform the actions of block 1010.

At block 1020, the first wireless communication device performs, based on the CCA trigger indicated in the control signal, a CCA. In some aspects, block 1020 includes performing an LBT. The LBT may be an LBT CAT2, LBT CAT3, or LBT CAT4. Performing the CCA may include sensing a channel for one or more time periods based on a CCA configuration. The CCA configuration may indicate a duration of the channel sensing, and/or a duration of different time periods of the CCA. For example, performing the CCA may include performing an LBT CAT2, which has a fixed duration of 25 μs or 16 μs. The duration may be based on the subcarrier spacing (SCS) of the sensed channel. In some aspects, performing the CCA includes performing an LBT CAT4, which includes a fixed defer period followed by a random backoff period. The random backoff period may be based on a random counter value selected by the first wireless communication device, as described above with respect to FIGS. 3 and 4. The wireless communication device 700 may use one or more components, such as the processor 702, memory 704, coordinated CCA module 708, transceiver 710, and/or the antennas 716, to perform the actions of block 1020.

At block 1030, the first wireless communication device receives, from the second wireless communication device based on the CCA, a first CCA success signal. In some aspects, block 1030 may include the first wireless communication device receiving, from the second wireless communication device, a reference signal scrambled by the second wireless communication device's ID. In some aspects, the first success signal may include DCI transmitted over PDCCH, UCI transmitted over PUCCH, SCI transmitted over PSCCH, and/or any other suitable control signal. The first wireless communication device may receive the first success signal from the second wireless communication device based on the second wireless communication device determining that the CCA passed. The first wireless communication device may receive the first success signal over a licensed band, or over an unlicensed band. For example, the first wireless communication device may receive the first success signal on the shared frequency band for which the COT is being acquired. The wireless communication device 700 may use one or more components, such as the processor 702, memory 704, coordinated CCA module 708, transceiver 710, and/or the antennas 716, to perform the actions of block 1030.

At block 1040, the first wireless communication device transmits, to the second wireless communication device, a second success signal. As similarly explained above, block 1040 may include the first wireless communication device transmitting, to the second wireless communication device, a reference signal scrambled by the first wireless communication device's ID. In some aspects, the second success signal may include DCI received over PDCCH, UCI received over PUCCH, SCI received over PSCCH, and/or any other suitable control signal. The first wireless communication device may transmit the second success signal to the second wireless communication device based on the first wireless communication device determining that the CCA performed by the second wireless communication device results in a pass. For example, performing the CCA may include performing an LBT, and the first wireless communication device may be configured to transmit the second success signal if the LBT results in a pass (e.g., measured signal energy/power falls below ED threshold). It will be understood that blocks 1030 and 1040 may not be performed in the order of receiving first and transmitting second. In this regard, in some aspects, the first wireless communication device may receive the first success signal before transmitting the second success signal. In other aspects, the first wireless communication device may transmit the second success signal before receiving the first success signal. The wireless communication device 700 may use one or more components, such as the processor 702, memory 704, coordinated CCA module 708, transceiver 710, and/or the antennas 716, to perform the actions of block 1040.

At block 1050, the first wireless communication device initiates, based on the first CCA success signal and the second CCA success signal, a channel occupancy time (COT). The COT may be associated with the second wireless communication device. For example, the first wireless communication device, and the COT may be a BS-initiated COT. The wireless communication device 700 may use one or more components, such as the processor 702, memory 704, coordinated CCA module 708, transceiver 710, and/or the antennas 716, to perform the actions of block 1050.

At block 1060, the first wireless communication device communicates, via the second communication device, a communication in the COT. In an exemplary aspect, the second wireless communication device includes a repeater or relay device. For example, the second wireless communication device may include a smart repeater configured to amplify and forward communications between the first wireless communication device and other wireless communication devices in the network. In some aspects, communicating the communication may include receiving the communication from a third wireless communication device (e.g., a UE) via the second wireless communication device. In other aspects, communicating the communication may include transmitting, via the second wireless communication device, the communication to a receiving wireless communication device (e.g., a UE) different from the second wireless communication device. The wireless communication device 700 may use one or more components, such as the processor 702, memory 704, coordinated CCA module 708, transceiver 710, and/or the antennas 716, to perform the actions of block 1060.

In some aspects, the control signal may indicate a CCA configuration for a coordinated CCA. In other aspects, the first wireless communication device may transmit a CCA timing configuration in a different control signal. The CCA configuration may specify a defer period, a backoff counter value, and/or any other suitable CCA timing parameter. In one aspect, the CCA configuration may indicate the defer period as 16 µs+m*9 µs, where m is associated with the priority class (e.g., CAPC) of the scheduled UL communication. The random backoff period may involve an additional period of N*9 µs, where N is an integer. In some aspects, N may be a random integer determined or selected by the first wireless communication device. In another aspect, N may be a non-random value that is assignable based on an indication from the BS. For example, in some aspects, the first wireless communication device may receive the indication of the entry or row of the channel access table. The entry or row may indicate the value N.

In other aspects, the CCA configuration may include or indicate other parameters of a coordinated CCA. For example, the CCA configuration may include or indicate a time offset for the beginning of the CCA as performed by the first wireless communication device, and the beginning of the CCA as performed by the second wireless communication device. In some aspects, the time offset may indicate the first wireless communication device and the second wireless communication device to start the CCA at the same time, or with a fixed time offset between them. The time offset parameter may indicate a number of µs, a number of slots, or a number of symbols, for example. In another aspect, the CCA configuration may include or indicate a maximum time limit for the coordinated CCA. For example, the maximum time limit may indicate a maximum time at which the first wireless communication device and/or the second wireless communication device will cease or cancel the CCA if the CCA is not yet complete. In some aspects, the CCA configuration may indicate a type of the CCA (e.g., LBT CAT2, LBT CAT3, LBT CAT4). In another aspect, the CCA configuration may indicate a sensing beam configuration. For example, the CCA configuration may indicate the first wireless communication device to sense in all or a portion of available beam directions, including front-haul beam directions toward the second wireless communication device, and service beam directions toward other wireless communication devices (e.g., UEs) in the network. In some aspects, the sensing beam configuration may indicate one or more beam directions and/or TCI states for performing the CCA. In another aspect, the CCA configuration may indicate an initial counter value for an LBT CAT4. For example, the CCA configuration may indicate a non-random backoff counter value that can be used by the first wireless communication device instead of a random backoff counter value. In some aspects, the CCA configuration may include or indicate a same counter value for both the first wireless communication device and the second wireless communication device such that the duration of the CCAs performed by the first wireless communication device and the second wireless communication device may be the same. In other aspects, the CCA configuration may indicate different counter values for the first wireless communication device and the second wireless communication device. In another aspect, the CCA configuration may include or indicate one or more parameters for an indication signal. For example, the CCA configuration may indicate a signal index, candidate resources for transmitting and/or receiving success signals or restart signals, and or any other suitable signal parameter. In one example, the CCA configuration may indicate that the indication signal spans 1 sensing slot, 2 sensing slots, 1 symbol, 2 symbols, 4 symbols, 7 symbols, or any other suitable time measurement. In another aspect, the CCA configuration indicates a first sensing slot for an indication signal transmission, and a different second sensing slot for an indication signal reception. The first wireless communication device may perform the CCA based on the CCA configuration described above. The CCA configuration may include a CCA timing configuration.

In one aspect, the control signal indicating the CCA trigger may trigger the second wireless communication device to perform a plurality of CCAs. For example, the trigger may indicate the second wireless communication device to perform one coordinated LBT with the first wireless communication device. In another aspect, the control signal may include a trigger to perform a plurality of coordinated LBTs. Each successive LBT may begin with a specified offset after completion of a COT. The specified offset may be indicated in the CCA configuration. In another aspect, the first wireless communication may transmit the control signal in a COT in an unlicensed band. In some aspects, the COT in which the control signal is transmitted may be a COT that is initiated based on a coordinated CCA, as described above. In another aspect, the first wireless communication device may transmit the control message over a licensed band. For example, the first wireless communication device may be configured to communicate in multiple frequency bands, including licensed and unlicensed bands. The first wireless communication device may be configured to transmit for the control signal on a first licensed band, and to perform the CCA on a different unlicensed band.

As explained above, in some instances, the first wireless communication device may receive, or transmit, a restart signal based on the coordinated CCA. The first wireless communication device may restart the CCA based on the restart signal. Following the restart, the first wireless communication device may transmit and/or receive a success signal. Accordingly, the first wireless communication device may restart the CCA without receiving a control signal as in block 1010. In some aspects, if the first wireless communication device detects signal energy rising above the threshold during the CCA, the first wireless communication device may determine whether a success signal was received from the second wireless communication device during the CCA, and/or whether the detected signal energy is associated with the received success signal. For example, the CCA configuration may indicate a candidate success signal sensing slot within the CCA period. Accordingly, the first wireless communication device may treat the candidate sensing slot as idle for the purposes of the CCA if a success signal was received in the candidate sensing slot after a detection latency.

In some aspects, the first wireless communication device may perform additional channel sensing during a first gap period between transmitting the first success signal, and receiving the second success signal. For example, the first wireless communication device may be configured to continue sensing the shared radio frequency band during the first gap period and comparing the sensed energy to a threshold. In another aspect, the first wireless communication device may perform additional channel sensing during a second gap period between the last-communicated success signal (received or transmitted) and the beginning of the COT. For example, the first wireless communication device may be configured to continue sensing the shared radio frequency band during the second gap period and comparing the sensed energy to a threshold. In another aspect, the first wireless communication device is configured to perform additional channel sensing during a gap period that extends between transmitting the success signal and the beginning of the COT. The first wireless communication may continue to regard candidate sensing slots as idle if a success signal is received in the candidate sensing slots, as explained above.

In some aspects, if the first wireless communication device detects busy signals or interference that exceeds a threshold during any of the gap periods described above, the first wireless communication device may cancel the COT and transmit, to the second wireless communication device, a restart indication or restart signal. The first wireless communication device may transmit the restart indication after a latency period associated with processing and decoding sensing slot candidates to determine whether a success signal was received. Because the of the latency period, in some instances, the first wireless communication device may transmit or receive a restart indication after initiating the COT. For example, the first wireless communication device may sense or detect that the channel is busy immediately before the COT, and transmit the restart indication after the second wireless communication device has initiated the COT. Accordingly, the second wireless communication device may receive the restart indication during the COT, and cancel the COT after initiating.

Further aspects of the present disclosure include the following:

Aspect 1. A method of wireless communication performed by a first wireless communication device, the method comprising:

receiving a control signal indicating a clear channel assessment (CCA) trigger associated with the first wireless communication device and a second wireless communication device;

performing, based on the CCA trigger, a CCA; transmitting, to the second wireless communication device based on the CCA, a first CCA success signal;

receiving, from the second wireless communication device, a second CCA success signal;

initiating, based on the first CCA success signal and the second CCA success signal, a channel occupancy time (COT); and amplifying and forwarding a communication in the COT.

Aspect 2. The method of aspect 1, wherein the receiving the control signal comprises receiving the control signal from a third wireless communication device, the third wireless communication device being different from the first wireless communication device and the second wireless communication device.

Aspect 3. The method of aspect 1, wherein the receiving the control signal comprises receiving the control signal from the second wireless communication device.

Aspect 4. The method of any of aspects 1-3, wherein: the control signal further indicates a first CCA timing configuration; and the performing the CCA is further based on the first CCA timing configuration.

Aspect 5. The method of any of aspects 1-4, further comprising: performing a plurality of CCAs based on the CCA trigger, the plurality of CCAs including the CCA.

Aspect 6. The method of any of aspects 1-5, further comprising:
transmitting, to the second wireless communication device, a third CCA success signal during a first time period; and
performing channel sensing during a second time period following the first time period.

Aspect 7. The method of aspect 6, further comprising:
transmitting, to the second wireless communication device in response to detecting interference during the second time period, a restart indication; and
restarting the CCA,
wherein the transmitting the first CCA success signal comprises transmitting the first CCA success signal during a third time period following the second time period.

Aspect 8. The method of any of aspects 1-5, further comprising:
transmitting, to the second wireless communication device during a first time period, a third CCA success signal;
receiving, from the second wireless communication device during a second time period following the first time period, a fourth CCA success signal; and
performing channel sensing during a third time period following the second time period and before the COT.

Aspect 9. The method of aspect 8, further comprising:
transmitting, based on the channel sensing, a restart indication to the second wireless communication device.

Aspect 10. The method of aspect 9, wherein the transmitting the restart indication comprises transmitting the restart indication during the COT.

Aspect 11. The method of aspect 8, further comprising:
receiving, from the second wireless communication device, a restart indication; and refraining, based on the restart indication, from communicating during the COT.

Aspect 12. A method of wireless communication performed by a first wireless communication device, the method comprising:
transmitting, to a second wireless communication device, a control signal indicating a clear channel assessment (CCA) trigger associated with the first wireless communication device and the second wireless communication device;
performing, based on the CCA trigger, a CCA;
receiving, from the second wireless communication device, a first CCA success signal; and
transmitting, to the second wireless communication device based on the CCA, a second CCA success signal; and
initiating, based on the first CCA success signal and the second CCA success signal, a channel occupancy time (COT); and
communicating, via the second wireless communication device, a communication in the COT.

Aspect 13. The method of aspect 12, wherein:
the performing the CCA comprises detecting a signal energy exceeding an energy detection (ED) threshold associated with the CCA;
the receiving the first CCA success signal comprises receiving the first CCA success signal during the CCA; and
the transmitting the second CCA success signal is further based on the first CCA success signal being received during the CCA.

Aspect 14. The method of any of aspects 12 or 13, further comprising:
receiving, from the second wireless communication device during a first time period, a restart indication,
wherein the receiving the first CCA success signal comprises receiving the first CCA success signal during a second time period subsequent to the first time period, and
wherein the transmitting the second CCA success signal comprises transmitting the second CCA success signal during a third time period subsequent to the second time period.

Aspect 15. The method of any of aspects 12-14, further comprising:
transmitting, to the second wireless communication device based on the second CCA, a third CCA success signal during a first time period; and
performing channel sensing during a second time period following the first time period.

Aspect 16. The method of aspect 15, further comprising:
receiving, from the second wireless communication device, the first CCA success signal during a third time period between the first time period and the second time period.

Aspect 17. The method of aspect 15, further comprising:
receiving, from the second wireless communication device, during the COT, a restart indication; and
refraining, based on the restart indication, from communicating during the COT.

Aspect 18. A first wireless communication device, comprising:
a transceiver; and
a processor in communication with the transceiver and configured to cause the transceiver to:
receive a control signal indicating a clear channel assessment (CCA) trigger associated with the first wireless communication device and a second wireless communication device;
perform, based on the CCA trigger, a CCA;
transmit, to the second wireless communication device based on the CCA, a first CCA success signal;
receive, from the second wireless communication device, a second CCA success signal;
initiate, based on the first CCA success signal and the second CCA success signal, a channel occupancy time (COT); and
amplify and forward a communication in the COT.

Aspect 19. The first wireless communication device of aspect 18, wherein the processor configured to cause the transceiver to receive the control signal comprises the processor configured to cause the transceiver to receive the control signal from a third wireless communication device, the third wireless communication device being different from the first wireless communication device and the second wireless communication device.

Aspect 20. The first wireless communication device of aspect 18, wherein the processor configured to cause the transceiver to receive the control signal comprises the processor configured to cause the transceiver to receive the control signal from the second wireless communication device.

Aspect 21. The first wireless communication device of any of aspects 18-20, wherein:

the control signal further indicates a first CCA timing configuration; and the processor is configured to cause the transceiver to perform the CCA further based on the first CCA timing configuration.

Aspect 22. The first wireless communication device of any of aspects 18-21, wherein the processor is further configured to cause the transceiver to:

perform a plurality of CCAs based on the CCA trigger, the plurality of CCAs including the CCA.

Aspect 23. The first wireless communication device of any of aspects 18-22, wherein the processor is further configured to cause the transceiver to:

transmit, to the second wireless communication device, a third CCA success signal during a first time period; and perform channel sensing during a second time period following the first time period.

Aspect 24. The first wireless communication device of aspect 23, wherein the processor is further configured to cause the transceiver to:

transmit, to the second wireless communication device in response to detecting interference during the second time period, a restart indication; and restart the CCA, wherein the processor configured to cause the transceiver to transmit the first CCA success signal comprises the processor configured to cause the transceiver to transmit the first CCA success signal during a third time period following the second time period.

Aspect 25. The first wireless communication device of any of aspects 18-22, wherein the processor is further configured to cause the transceiver to:

transmit, to the second wireless communication device during a first time period, a third CCA success signal;

receive, from the second wireless communication device during a second time period following the first time period, a fourth CCA success signal; and perform channel sensing during a third time period following the second time period and before the COT.

Aspect 26. The first wireless communication device of aspect 25, wherein the processor is further configured to cause the transceiver to:

transmit, based on the channel sensing, a restart indication to the second wireless communication device.

Aspect 27. The first wireless communication device of aspect 26, wherein the processor configured to cause the transceiver to transmit the restart indication comprises the processor configured to cause the transceiver to transmit the restart indication during the COT.

Aspect 28. The first wireless communication device of aspect 25, wherein the processor is further configured to cause the transceiver to:

receive, from the second wireless communication device, a restart indication; and refrain, based on the restart indication, from communicate during the COT.

Aspect 29. A first wireless communication device, comprising:

a transceiver; and a processor in communication with the transceiver and configured to cause the transceiver to:

transmit, to a second wireless communication device, a control signal indicating a clear channel assessment (CCA) trigger associated with the first wireless communication device and the second wireless communication device;

perform, based on the CCA trigger, a CCA;

receive, from the second wireless communication device, a first CCA success signal; and transmit, to the second wireless communication device based on the CCA, a second CCA success signal; and initiate, based on the first CCA success signal and the second CCA success signal, a channel occupancy time (COT); and communicate, via the second wireless communication device, a communication in the COT.

Aspect 30. The first wireless communication device of aspect 29, wherein:

the processor configured to cause the transceiver to perform the CCA comprises detecting a signal energy exceeding an energy detection (ED) threshold associated with the CCA;

the processor configured to cause the transceiver to receive the first CCA success signal comprises the processor configured to cause the transceiver to receive the first CCA success signal during the CCA; and the processor configured to cause the transceiver to transmit the second CCA success signal is further based on the first CCA success signal being received during the CCA.

Aspect 31. The first wireless communication device of any of aspects 29 or 30, wherein the processor is further configured to cause the transceiver to:

receive, from the second wireless communication device during a first time period, a restart indication, and wherein the processor configured to cause the transceiver to receive the first CCA success signal comprises the processor configured to cause the transceiver to receive the first CCA success signal during a second time period subsequent to the first time period, and wherein the processor configured to cause the transceiver to transmit the second CCA success signal comprises the processor configured to cause the transceiver to transmit the second CCA success signal during a third time period subsequent to the second time period.

Aspect 32. The first wireless communication device of any of aspects 29-31, wherein the processor is further configured to cause the transceiver to:

transmit, to the second wireless communication device based on the second CCA, a third CCA success signal during a first time period; and perform channel sensing during a second time period following the first time period.

Aspect 33. The first wireless communication device of aspect 32, wherein the processor is further configured to cause the transceiver to:

receive, from the second wireless communication device, the first CCA success signal during a third time period between the first time period and the second time period.

Aspect 34. The first wireless communication device of aspect 32, wherein the processor is further configured to cause the transceiver to:

receive, from the second wireless communication device, during the COT, a restart indication; and refrain, based on the restart indication, from communicating during the COT.

Aspect 35. A non-transitory, computer-readable medium having program code recorded thereon, the program code comprising:

code for causing a first wireless communication device to receive a control signal indicating a clear channel assessment (CCA) trigger associated with the first wireless communication device and a second wireless communication device;

code for causing the first wireless communication device to perform, based on the CCA trigger, a CCA;

code for causing the first wireless communication device to transmit, to the second wireless communication device based on the CCA, a first CCA success signal;

code for causing the first wireless communication device to receive, from the second wireless communication device, a second CCA success signal;

code for causing the first wireless communication device to initiate, based on the first CCA success signal and the second CCA success signal, a channel occupancy time (COT); and code for causing the first wireless communication device to amplify and forward a communication in the COT.

Aspect 36. The non-transitory, computer readable medium of aspect 35, wherein the code for causing the first wireless communication device to receive the control signal comprises code for causing the first wireless communication device to receive the control signal from a third wireless communication device, the third wireless communication device being different from the first wireless communication device and the second wireless communication device.

Aspect 37. The non-transitory, computer readable medium of aspect 35, wherein the code for causing the first wireless communication device to receive the control signal comprises code for causing the first wireless communication device to receive the control signal from the second wireless communication device.

Aspect 38. The non-transitory, computer readable medium of any of aspects 35-37, wherein:

the control signal further indicates a first CCA timing configuration; and the code for causing the first wireless communication device to perform the CCA further based on the first CCA timing configuration.

Aspect 39. The non-transitory, computer readable medium of any of aspects 35-38, wherein the program code further comprises:

code for causing the first wireless communication device to perform a plurality of CCAs based on the CCA trigger, the plurality of CCAs including the CCA.

Aspect 40. The non-transitory, computer readable medium of any of aspects 35-39, wherein the program code further comprises:

code for causing the first wireless communication device to transmit, to the second wireless communication device, a third CCA success signal during a first time period; and code for causing the first wireless communication device to perform channel sensing during a second time period following the first time period.

Aspect 41. The non-transitory, computer readable medium of aspect 40, wherein the program code further comprises:

code for causing the first wireless communication device to transmit, to the second wireless communication device in response to detecting interference during the second time period, a restart indication; and code for causing the first wireless communication device to restart the CCA, wherein the code for causing the first wireless communication device to transmit the first CCA success signal comprises code for causing the first wireless communication device to transmit the first CCA success signal during a third time period following the second time period.

Aspect 42. The non-transitory, computer readable medium of any of aspects 35-39, wherein the program code further comprises:

code for causing the first wireless communication device to transmit, to the second wireless communication device during a first time period, a third CCA success signal;

code for causing the first wireless communication device to receive, from the second wireless communication device during a second time period following the first time period, a fourth CCA success signal; and code for causing the first wireless communication device to perform channel sensing during a third time period following the second time period and before the COT.

Aspect 43. The non-transitory, computer readable medium of aspect 42, wherein the program code further comprises:

code for causing the first wireless communication device to transmit, based on the channel sensing, a restart indication to the second wireless communication device.

Aspect 44. The non-transitory, computer readable medium of aspect 43, wherein the code for causing the first wireless communication device to transmit the restart indication comprises code for causing the first wireless communication device to transmit the restart indication during the COT.

Aspect 45. The non-transitory, computer readable medium of aspect 42, wherein the program code further comprises:

code for causing the first wireless communication device to receive, from the second wireless communication device, a restart indication; and code for causing the first wireless communication device to refrain, based on the restart indication, from communicate during the COT.

Aspect 46. A non-transitory, computer-readable medium having program code recorded thereon, the program code comprising:

code for causing the first wireless communication device to transmit, to a second wireless communication device, a control signal indicating a clear channel assessment (CCA) trigger associated with the first wireless communication device and the second wireless communication device;

code for causing the first wireless communication device to perform, based on the CCA trigger, a CCA;

code for causing the first wireless communication device to receive, from the second wireless communication device, a first CCA success signal; and code for causing the first wireless communication device to transmit, to the second wireless communication device based on the CCA, a second CCA success signal; and code for causing the first wireless communication device to initiate, based on the first CCA success signal and the second CCA success signal, a channel occupancy time (COT); and code for causing the first wireless communication device to communicate, via the second wireless communication device, a communication in the COT.

Aspect 47. The non-transitory, computer readable medium of aspect 46, wherein:

the code for causing the first wireless communication device to perform the CCA comprises detecting a signal energy exceeding an energy detection (ED) threshold associated with the CCA;

the code for causing the first wireless communication device to receive the first CCA success signal comprises code for causing the first wireless communication device to receive the first CCA success signal during the CCA; and the code for causing the first wireless communication device to transmit the second CCA success signal is further based on the first CCA success signal being received during the CCA.

Aspect 48. The non-transitory, computer readable medium of any of aspects 46 or 47, wherein the program code further comprises:
 code for causing the first wireless communication device to receive, from the second wireless communication device during a first time period, a restart indication,
 wherein the code for causing the first wireless communication device to receive the first CCA success signal comprises code for causing the first wireless communication device to receive the first CCA success signal during a second time period subsequent to the first time period, and
 wherein the code for causing the first wireless communication device to transmit the second CCA success signal comprises code for causing the first wireless communication device to transmit the second CCA success signal during a third time period subsequent to the second time period.

Aspect 49. The non-transitory, computer readable medium of any of aspects 46-48, wherein the program code further comprises:
 code for causing the first wireless communication device to transmit, to the second wireless communication device based on the second CCA, a third CCA success signal during a first time period; and code for causing the first wireless communication device to perform channel sensing during a second time period following the first time period.

Aspect 50. The non-transitory, computer readable medium of aspect 49, wherein the program code further comprises:
 code for causing the first wireless communication device to receive, from the second wireless communication device, the first CCA success signal during a third time period between the first time period and the second time period.

Aspect 51. The non-transitory, computer readable medium of aspect 49, wherein the program code further comprises:
 code for causing the first wireless communication device to receive, from the second wireless communication device, during the COT, a restart indication; and
 code for causing the first wireless communication device to refrain, based on the restart indication, from communicate during the COT.

Aspect 52. A first wireless communication device, comprising:
 means for receiving a control signal indicating a clear channel assessment (CCA) trigger associated with the first wireless communication device and a second wireless communication device;
 means for performing, based on the CCA trigger, a CCA;
 means for transmitting, to the second wireless communication device based on the CCA, a first CCA success signal;
 means for receiving, from the second wireless communication device, a second CCA success signal;
 means for initiating, based on the first CCA success signal and the second CCA success signal, a channel occupancy time (COT); and means for amplifying and forwarding a communication in the COT.

Aspect 53. The wireless communication device of aspect 52, wherein the means for receiving the control signal comprises means for receiving the control signal from a third wireless communication device, the third wireless communication device being different from the first wireless communication device and the second wireless communication device.

Aspect 54. The wireless communication device of aspect 52, wherein the means for receiving the control signal comprises means for receiving the control signal from the second wireless communication device.

Aspect 55. The wireless communication device of any of aspects 52-54, wherein:
 the control signal further indicates a first CCA timing configuration; and the means for performing the CCA is further based on the first CCA timing configuration.

Aspect 56. The wireless communication device of any of aspects 52-55, further comprising:
 means for performing a plurality of CCAs based on the CCA trigger, the plurality of CCAs including the CCA.

Aspect 57. The wireless communication device of any of aspects 52-56, further comprising:
 means for transmitting, to the second wireless communication device, a third CCA success signal during a first time period; and
 means for performing channel sensing during a second time period following the first time period.

Aspect 58. The wireless communication device of aspect 57, further comprising:
 means for transmitting, to the second wireless communication device in response to detecting interference during the second time period, a restart indication; and
 means for restarting the CCA,
 wherein the means for transmitting the first CCA success signal comprises means for transmitting the first CCA success signal during a third time period following the second time period.

Aspect 59. The wireless communication device of any of aspects 52-56, further comprising:
 means for transmitting, to the second wireless communication device during a first time period, a third CCA success signal;
 means for receiving, from the second wireless communication device during a second time period following the first time period, a fourth CCA success signal; and
 means for performing channel sensing during a third time period following the second time period and before the COT.

Aspect 60. The wireless communication device of aspect 59, further comprising:
 means for transmitting, based on the channel sensing, a restart indication to the second wireless communication device.

Aspect 61. The wireless communication device of aspect 60, wherein the means for transmitting the restart indication comprises means for transmitting the restart indication during the COT.

Aspect 62. The wireless communication device of aspect 59, further comprising:
 means for receiving, from the second wireless communication device, a restart indication; and
 means for refraining, based on the restart indication, from means for communicating during the COT.

Aspect 63. A first wireless communication device, comprising:
 means for transmitting, to a second wireless communication device, a control signal indicating a clear channel assessment (CCA) trigger associated with the first wireless communication device and the second wireless communication device;
 means for performing, based on the CCA trigger, a CCA;
 means for receiving, from the second wireless communication device, a first CCA success signal; and
 means for transmitting, to the second wireless communication device based on the CCA, a second CCA success signal; and means for initiating, based on the first CCA success signal and the second CCA success signal, a channel occupancy time (COT); and means for communicating, via the second wireless communication device, a communication in the COT.

Aspect 64. The wireless communication device of aspect 63, wherein:

the means for performing the CCA comprises detecting a signal energy exceeding an energy detection (ED) threshold associated with the CCA;

the means for receiving the first CCA success signal comprises means for receiving the first CCA success signal during the CCA; and the means for transmitting the second CCA success signal is further based on the first CCA success signal being received during the CCA.

Aspect 65. The wireless communication device of any of aspects 63 or 64, further comprising:

means for receiving, from the second wireless communication device during a first time period, a restart indication; and wherein the means for receiving the first CCA success signal comprises means for receiving the first CCA success signal during a second time period subsequent to the first time period, and wherein the means for transmitting the second CCA success signal comprises means for transmitting the second CCA success signal during a third time period subsequent to the second time period.

Aspect 66. The wireless communication device of any of aspects 63-65, further comprising:

means for transmitting, to the second wireless communication device based on the second CCA, a third CCA success signal during a first time period; and means for performing channel sensing during a second time period following the first time period.

Aspect 67. The wireless communication device of aspect 66, further comprising:

means for receiving, from the second wireless communication device, the first CCA success signal during a third time period between the first time period and the second time period.

Aspect 68. The wireless communication device of aspect 66, further comprising:

means for receiving, from the second wireless communication device, during the COT, a restart indication; and means for refraining, based on the restart indication, from means for communicating during the COT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:

receiving a control signal indicating a clear channel assessment (CCA) trigger associated with the first wireless communication device and a second wireless communication device;

performing, based on the CCA trigger and at the first wireless communication device, a CCA;

transmitting, to the second wireless communication device based on the CCA, a first CCA success signal indicating that the CCA has passed;

receiving, from the second wireless communication device, a second CCA success signal indicating that a CCA performed by the second wireless communication device has passed;

initiating, based on the first CCA success signal and the second CCA success signal, a channel occupancy time (COT); and amplifying and forwarding a communication in the COT to at least a receiving wireless communication device.

2. The method of claim 1, wherein the receiving the control signal comprises receiving the control signal from a third wireless communication device, the third wireless communication device being different from the first wireless communication device and the second wireless communication device.

3. The method of claim 1, wherein the receiving the control signal comprises receiving the control signal from the second wireless communication device.

4. The method of claim 1, wherein:
the control signal further indicates a first CCA timing configuration; and
the performing the CCA is further based on the first CCA timing configuration.

5. The method of claim 1, further comprising:
performing a plurality of CCAs based on the CCA trigger, the plurality of CCAs including the CCA.

6. The method of claim 1, further comprising:
transmitting, to the second wireless communication device, a third CCA success signal during a first time period; and
performing channel sensing during a second time period following the first time period.

7. The method of claim 6, further comprising:
transmitting, to the second wireless communication device in response to detecting interference during the second time period, a restart indication; and
restarting the CCA,
wherein the transmitting the first CCA success signal comprises transmitting the first CCA success signal during a third time period following the second time period.

8. The method of claim 1, further comprising:
transmitting, to the second wireless communication device during a first time period, a third CCA success signal;
receiving, from the second wireless communication device during a second time period following the first time period, a fourth CCA success signal; and
performing channel sensing during a third time period following the second time period and before the COT.

9. The method of claim 8, further comprising:
transmitting, based on the channel sensing, a restart indication to the second wireless communication device.

10. The method of claim 9, wherein the transmitting the restart indication comprises transmitting the restart indication during the COT.

11. The method of claim 8, further comprising:
receiving, from the second wireless communication device, a restart indication; and
refraining, based on the restart indication, from communicating during the COT.

12. A method of wireless communication performed by a first wireless communication device, the method comprising:
transmitting, to a second wireless communication device, a control signal indicating a clear channel assessment (CCA) trigger associated with the first wireless communication device and the second wireless communication device;
performing, based on the CCA trigger and at the first wireless communication device, a CCA;
receiving, from the second wireless communication device, a first CCA success signal indicating that a CCA performed by the second wireless communication device has passed; and
transmitting, to the second wireless communication device based on the CCA, a second CCA success signal indicating that the CCA has passed; and
initiating, based on the first CCA success signal and the second CCA success signal, a channel occupancy time (COT); and
communicating, via the second wireless communication device, a communication in the COT.

13. The method of claim 12, wherein:
the performing the CCA comprises detecting a signal energy exceeding an energy detection (ED) threshold associated with the CCA;
the receiving the first CCA success signal comprises receiving the first CCA success signal during the CCA; and
the transmitting the second CCA success signal is further based on the first CCA success signal being received during the CCA.

14. The method of claim 12, further comprising:
receiving, from the second wireless communication device during a first time period, a restart indication,
wherein the receiving the first CCA success signal comprises receiving the first CCA success signal during a second time period subsequent to the first time period, and
wherein the transmitting the second CCA success signal comprises transmitting the second CCA success signal during a third time period subsequent to the second time period.

15. The method of claim 12, further comprising:
transmitting, to the second wireless communication device, a third CCA success signal during a first time period; and
performing channel sensing during a second time period following the first time period.

16. The method of claim 15, further comprising:
receiving, from the second wireless communication device, the first CCA success signal during a third time period between the first time period and the second time period.

17. The method of claim 15, further comprising:
receiving, from the second wireless communication device, during the COT, a restart indication; and
refraining, based on the restart indication, from communicating during the COT.

18. A first wireless communication device, comprising:
a transceiver; and
a processor in communication with the transceiver and configured to cause the transceiver to:
receive a control signal indicating a clear channel assessment (CCA) trigger associated with the first wireless communication device and a second wireless communication device;
perform, based on the CCA trigger and at the first wireless communication device, a CCA;
transmit, to the second wireless communication device based on the CCA, a first CCA success signal indicating that the CCA has passed;
receive, from the second wireless communication device, a second CCA success signal indicating that a CCA performed by the second wireless communication device has passed;
initiate, based on the first CCA success signal and the second CCA success signal, a channel occupancy time (COT); and
amplify and forward a communication in the COT to at least a receiving wireless communication device.

19. The first wireless communication device of claim 18, wherein the processor configured to cause the transceiver to receive the control signal comprises the processor configured to cause the transceiver to receive the control signal from a third wireless communication device, the third wireless communication device being different from the first wireless communication device and the second wireless communication device.

20. The first wireless communication device of claim 18, wherein the processor configured to cause the transceiver to receive the control signal comprises the processor configured to cause the transceiver to receive the control signal from the second wireless communication device.

21. The first wireless communication device of claim 18, wherein the processor is further configured to cause the transceiver to:
perform a plurality of CCAs based on the CCA trigger, the plurality of CCAs including the CCA.

22. The first wireless communication device of claim 18, wherein the processor is further configured to cause the transceiver to:
transmit, to the second wireless communication device, a third CCA success signal during a first time period;
perform channel sensing during a second time period following the first time period,
transmit, to the second wireless communication device in response to detecting interference during the second time period, a restart indication; and
restart the CCA,
wherein the processor configured to cause the transceiver to transmit the first CCA success signal comprises the processor configured to cause the transceiver to transmit the first CCA success signal during a third time period following the second time period.

23. The first wireless communication device of claim 18, further comprising:
transmitting, to the second wireless communication device during a first time period, a third CCA success signal;
receiving, from the second wireless communication device during a second time period following the first time period, a fourth CCA success signal; and
performing channel sensing during a third time period following the second time period and before the COT.

24. The first wireless communication device of claim 23, wherein the processor is further configured to cause the transceiver to:
receive, from the second wireless communication device, a restart indication; and
refrain, based on the restart indication, from communicating during the COT.

25. A first wireless communication device, comprising:
a transceiver; and
a processor in communication with the transceiver and configured to cause the transceiver to:
transmit, to a second wireless communication device, a control signal indicating a clear channel assessment (CCA) trigger associated with the first wireless communication device and the second wireless communication device;
perform, based on the CCA trigger and at the first wireless communication device, a CCA;
receive, from the second wireless communication device, a first CCA success signal indicating that a CCA performed by the second wireless communication device has passed; and
transmit, to the second wireless communication device based on the CCA, a second CCA success signal indicating that the CCA has passed; and
initiate, based on the first CCA success signal and the second CCA success signal, a channel occupancy time (COT); and
communicate, via the second wireless communication device, a communication in the COT.

26. The first wireless communication device of claim 25, wherein:
the processor configured to cause the transceiver to perform the CCA comprises processor configured to cause the transceiver to detect a signal energy exceeding an energy detection (ED) threshold associated with the CCA;
the processor configured to cause the transceiver to receive the first CCA success signal comprises the processor configured to cause the transceiver to receive the first CCA success signal during the CCA; and
the processor configured to cause the transceiver to the second CCA success signal is further based on the first CCA success signal being received during the CCA.

27. The first wireless communication device of claim 25, wherein the processor is configured to cause the transceiver to:
receive, from the second wireless communication device during a first time period, a restart indication,
wherein the processor configured to cause the transceiver to receive the first CCA success signal comprises the processor configured to cause the transceiver to receive the first CCA success signal during a second time period subsequent to the first time period, and
wherein the processor configured to cause the transceiver to transmit the second CCA success signal comprises the processor configured to cause the transceiver to transmit the second CCA success signal during a third time period subsequent to the second time period.

28. The first wireless communication device of claim 25, wherein the processor is configured to cause the transceiver to:
transmit, to the second wireless communication device, a third CCA success signal during a first time period; and
perform channel sensing during a second time period following the first time period.

29. The first wireless communication device of claim 28, wherein the processor is configured to cause the transceiver to:
receive, from the second wireless communication device, the first CCA success signal during a third time period between the first time period and the second time period.

30. The first wireless communication device of claim 28, wherein the processor is further configured to cause the transceiver to:
receive, from the second wireless communication device, during the COT, a restart indication; and
refrain, based on the restart indication, from communicate during the COT.

* * * * *